(12) United States Patent
Hamada et al.

(10) Patent No.: US 8,119,749 B2
(45) Date of Patent: Feb. 21, 2012

(54) METHOD OF TAKING (METH)ACRYLIC ESTER POLYMER OUT OF LIQUID REACTION MIXTURE

(75) Inventors: Kenichi Hamada, Tsukuba (JP); Susumu Matsunaga, Kurashiki (JP); Kazunori Watanabe, Kurashiki (JP); Masaji Kato, Tsukuba (JP); Jun Nagai, Kurashiki (JP); Tatsufumi Watanabe, Kamisu (JP); Tatsuo Morotomi, Kamisu (JP); Hiroshi Oshima, Kamisu (JP)

(73) Assignee: Kuraray Co., Ltd., Kurashiki-shi (JP)

( * ) Notice: Subject to any disclaimer, the term of this patent is extended or adjusted under 35 U.S.C. 154(b) by 580 days.

(21) Appl. No.: 11/996,426

(22) PCT Filed: Jul. 21, 2006

(86) PCT No.: PCT/JP2006/314460
§ 371 (c)(1),
(2), (4) Date: Jan. 22, 2008

(87) PCT Pub. No.: WO2007/011017
PCT Pub. Date: Jan. 25, 2007

(65) Prior Publication Data
US 2009/0118450 A1      May 7, 2009

(30) Foreign Application Priority Data

Jul. 22, 2005    (JP) .............................. 2005-212245

(51) Int. Cl.
*C08F 4/52*     (2006.01)
*C08F 2/00*     (2006.01)
*C08F 118/02*   (2006.01)
*C08F 4/46*     (2006.01)

(52) U.S. Cl. ............ 526/177; 526/71; 526/89; 526/173; 526/185; 526/187; 526/319

(58) Field of Classification Search .................... 526/71, 526/89, 319, 173, 177, 185, 187
See application file for complete search history.

(56) References Cited

U.S. PATENT DOCUMENTS

| | | | | |
|---|---|---|---|---|
| 3,296,172 A | * | 1/1967 | Wolff, Jr. et al. ............. | 523/332 |
| 5,026,807 A | * | 6/1991 | Ohira et al. .................. | 526/321 |
| 5,637,662 A | * | 6/1997 | Relvini et al. ................ | 526/213 |
| 5,656,704 A | * | 8/1997 | Wang et al. ................... | 526/187 |
| 6,767,976 B2 | * | 7/2004 | Hamada et al. ............... | 526/187 |
| 2002/0055569 A1 | * | 5/2002 | Ochiai et al. ................. | 524/284 |

FOREIGN PATENT DOCUMENTS

| | | | |
|---|---|---|---|
| JP | 60152438 A | * | 8/1985 |
| JP | 63 108003 | | 5/1988 |
| JP | 6 32814 | | 2/1994 |
| JP | 7 57766 | | 6/1995 |
| JP | 7 330819 | | 12/1995 |
| JP | 7 333894 | | 12/1995 |
| JP | 8 253527 | | 10/1996 |
| JP | 2000 44631 | | 2/2000 |
| JP | 2001 131216 | | 5/2001 |
| JP | 2001 158805 | | 6/2001 |
| JP | 2002 97219 | | 4/2002 |
| JP | 2002 356509 | | 12/2002 |
| WO | WO 02/085980 A1 | | 10/2002 |

OTHER PUBLICATIONS

JP-60152438; Yoshida et al; Aug. 1985; Abstract in English.*
"Handbook of Chemical Engineering", Maruzen Co., Ltd., p. 428-429, 1999.
"Collection of Recent Technology on Stirring, Mixing and Dispersion", Realize Science & Engineering Center Co., Ltd., p. 216-217, 1991.

* cited by examiner

*Primary Examiner* — Karuna P Reddy
(74) *Attorney, Agent, or Firm* — Oblon, Spivak, McClelland, Maier & Neustadt, L.L.P.

(57) ABSTRACT

The present invention relates to a method of obtaining a (meth)acrylate-based polymer from a reaction solution containing the (meth)acrylate-based polymer, the method including (a) adding an acid to the reaction solution containing the (meth)acrylate-based polymer which is obtained by polymerizing a monomer composed mainly of a (meth)acrylate in a water-insoluble organic solvent in the presence of a metal compound, (b) washing the reaction solution to which the acid has been added by admixing water at 90° C. or more, (c) separating the mixed solution of the reaction solution and water generated by the washing in (b) into an organic solvent solution layer and an aqueous solution layer, and (d) isolating each of the organic solvent solution layer and the aqueous solution layer in order to obtain the (meth)acrylate-based polymer from the isolated organic solvent solution layer.

13 Claims, No Drawings

METHOD OF TAKING (METH)ACRYLIC ESTER POLYMER OUT OF LIQUID REACTION MIXTURE

FIELD OF THE INVENTION

The present invention relates to a method of obtaining a (meth)acrylate-based polymer from a reaction solution containing the (meth)acrylate-based polymer and relates to the (meth)acrylate-based polymer obtained therefrom. The present invention relates in more detail to a method of smoothly and efficiently obtaining the (meth)acrylate-based polymer containing very low amount of a residual metal component, and having high purity, excellent transparency and other properties, by a simple operation from a reaction solution containing the (meth)acrylate-based polymer, obtained by polymerization of a monomer composed mainly of a (meth)acrylate in the presence of an organic alkali metal compound, organoaluminum compound or other metal compounds and relates to the (meth)acrylate-based polymer having high purity and excellent transparency and other properties obtained therefrom.

BACKGROUND ART

A polymerization initiator such as an organic alkali metal compound has been conventionally used for polymerization of a (meth)acrylate in an organic solvent to produce a (meth)acrylate-based polymer. In such a case, an organoaluminum compound is added together with the polymerization initiator into the polymerization system for the purpose of increasing the polymerization rate, improving the efficiency of polymerization initiation, improving the living characteristics during polymerization, narrowing a molecular weight distribution, moderating the polymerization conditions, controlling the stereoregularity and others (for example, see Patent Documents 1 to 4).

The presence of a metal component as impurities derived from a polymerization initiator or an organoaluminum compound in a (meth)acrylate-based polymer obtained by polymerization of a (meth)acrylate in the presence of the polymerization initiator and the organoaluminum compound failslowers weatherability, mechanical properties, transparency, tackiness or adhesion properties (when the (meth)acrylate-based polymer is used as a pressure sensitive adhesive or adhesive), thermal stability and others and also tends to cause coloration, failure in appearance, odor and others. In particular, transparency easily comes under the influence of impurities such as the alkali metal component or the aluminum component remaining in the (meth)acrylate-based polymer so that the content of such impurities is required to be controlled stringently to a possible lowest level in order to obtain a product having high transparency.

In this regard, the removal of the metal component such as the aluminum component or the alkali metal from a (meth)acrylate-based polymer has been carried out in accordance with the purpose of the (meth)acrylate-based polymer. In such case, a method of using a metal absorbent such as an ion-exchange resin and others for a reaction solution containing the (meth)acrylate-based polymer and a method of washing with an aqueous acidic solution such as an aqueous hydrochloric acid solution, an aqueous sulfuric acid solution, an aqueous nitric acid solution, an aqueous acetic acid solution, an aqueous citric acid solution, an aqueous propionic acid solution and the like are known as methods of removing the metal component (see Patent Documents 3 and 4).

However, a method of using an ion-exchange resin has a slow speed of removal (speed of purification treatment) of the metal component and poor efficiency and costs a great deal because an expensive ion-exchange resin is used, so that the method is not an industrially favorable method and is impractical.

On the other hand, a method of removing the metal component by washing with an aqueous acidic solution is simpler and more cost-efficient than that of using an ion-exchange resin. Removal of the metal component by washing with the aqueous acidic solution is generally performed by washing the (meth)acrylate-based polymer recovered from a reaction solution using an aqueous acidic solution in a temperature range of room temperature to 80° C. This method makes it possible to remove the alkali metal component contained in the (meth)acrylate-based polymer fairly efficiently, but the removal of the aluminum component is hard and it is difficult to fully remove the aluminum component in the (meth)acrylate-based polymer by a single washing with the aqueous acidic solution. Therefore, several times washing with the aqueous acidic solution, for example, 5 or more times is required to be carried out in order to obtain a high-purity (meth)acrylate-based polymer, from which the aluminum component is fully removed, so that this method might not be an efficient method. Also, when the aqueous acidic solution is directly added to the reaction solution containing the (meth)acrylate-based polymer and washing without isolating the (meth)acrylate-based polymer from the reaction solution, the aluminum component present in the reaction solution reacts with water and produces an aluminum hydroxide gel, which is difficult to separate, thus results in difficulty in removing the aluminum component fully and yielding a high-purity (meth)acrylate-based polymer.

Patent Document 1: Japanese Examined Patent Application Publication No. H7-57766
Patent Document 2: Japanese Patent Laid-Open Publication No. H7-330819
Patent Document 3: Japanese Patent Laid-Open Publication No. 2001-131216
Patent Document 4: Japanese Patent Laid-Open Publication No. 2001-158805
Non-patent Document 1: "Handbook of Chemical Engineering", Maruzen Co., Ltd., 1999, p. 429
Non-patent Document 2: "Collection of Recent Technology on Stirring, Mixing and Dispersion", Realize Science & Engineering Center Co., Ltd., 1991, p. 216

DISCLOSURE OF THE INVENTION

Problems to be Solved by the Invention

An object of the present invention is to provide a method, simpler than conventional ones, of substantially removing a metal component present in a reaction solution containing a (meth)acrylate-based polymer obtained by polymerization of a (meth)acrylate in the presence of a metal compound (in the presence of an organic alkali metal compound, organoaluminum compound or other metal compounds) and obtaining efficiently and smoothly the (meth)acrylate-based polymer with high purity, and having excellent transparency, excellent heat resistance, mechanical properties and others.

Another object of the present invention is to provide a (meth)acrylate-based polymer with high purity, excellent transparency and also excellent in other properties such as heat resistance, mechanical properties and others obtained by the present invention method.

Means for Solving the Problems

The present inventors have conducted studies to achieve the objective mentioned above. Instead of using the aforementioned conventional methods such as a method of washing a (meth)acrylate-based polymer recovered from a reaction solution with an aqueous acidic solution to remove a metal component such as an aluminum component, an alkali metal component and the like or a method of adding the aqueous acidic solution directly to a reaction solution containing a (meth)acrylate-based polymer to remove the metal components, the present inventors added an acid (acid not solved in water) to the reaction solution containing the (meth)acrylate-based polymer obtained by polymerization to bring metal components such as an aluminum component, an alkali metal component and the like present in the reaction solution into contact with the acid, and then washed the resultant reaction solution by adding hot water at 90° C. or more to the reaction solution. As a result, they have found that the metal components such as the aluminum component, alkali metal component and the like present in the reaction solution are efficiently and smoothly extracted to hot water at a high temperature and are transferred into an aqueous phase, and that the content of the metal component in an organic solvent phase in which the (meth)acrylate-based polymer is dissolved is consequently reduced substantially, leading to an extremely low residual amount of the metal components such as the aluminum component, alkali metal component and the like in the (meth)acrylate-based polymer, which has resulted in high purity.

Furthermore, the present inventors have found that, by repeating the above hot water washing at a temperature of 90° C. or more twice or more, the residual amount of the above metal components in the (meth)acrylate-based polymer is further reduced to yield an extremely pure (meth)acrylate-based polymer.

The present inventors have also found that, in the above method, the use of a carboxylic acid containing almost no or little amount of water as an acid added to the reaction solution containing a (meth)acrylate-based polymer allows the extraction and transfer of the aluminum component, the alkali metal component and other metal components contained in the reaction solution into hot water at high temperature to proceed more smoothly, that a mixed solution of the reaction solution and water after washing by adding hot water separates clearly into two layers of an aqueous solution layer and an organic solvent solution layer without forming a cloudy intermediate layer between both the layers, and that a highly pure (meth)acrylate-based polymer with an extremely low residual amount of the aluminum component, alkali metal component and other metal components is obtained efficiently.

The present inventors have further found that the above method is particularly useful as a method of obtaining a polymethacrylate, a diblock copolymer composed of a methacrylate-based polymer block and an acrylate-based polymer block or a triblock copolymer composed of a methacrylate-based polymer block, an acrylate-based polymer block and a methacrylate-based polymer block from a reaction solution containing the polymethacrylates and the block copolymers synthesized in the presence of a polymerization initiator composed of an organic alkali metal compound and an organoaluminum compound, that the polymethacrylate, the diblock copolymer or the triblock copolymer in high purity are obtained with a low residual amount of the aluminum component and alkali metal component, and that the polymethacrylate, the diblock copolymer or the triblock copolymer obtained in this way are reduced in coloration, failure in appearance, odor and other properties because of thermal stability improvement, and have extremely high transparency. The present invention has been accomplished based on these findings.

That is, the present invention relates to (1) a method of obtaining a (meth)acrylate-based polymer from a reaction solution containing the (meth)acrylate-based polymer, comprising steps of:

(a) adding an acid to the reaction solution containing the (meth)acrylate-based polymer obtained by a polymerization of a monomer composed mainly of a (meth)acrylate in a water-insoluble organic solvent in the presence of a metal compound;

(b) washing the reaction solution to which the acid is added in step (a) by admixing water at 90° C. or higher;

(c) separating the mixture of water and the reaction solution generated in step (b) into an organic solvent solution layer and an aqueous solution layer; and (d) isolating each of the organic solvent solution and the aqueous solution, and recovering the (meth)acrylate-based polymer obtained from the organic solvent solution isolated in step (d).

The present invention also relates to (2) a method of obtaining a (meth)acrylate-based polymer from a reaction solution containing the (meth)acrylate-based polymer, comprising steps of:

(a) adding an acid to the reaction solution containing the (meth)acrylate-based polymer obtained by a polymerization of a monomer composed mainly of a (meth)acrylate in a water-insoluble organic solvent in the presence of a metal compound;

(b) washing the reaction solution to which the acid is added in step (a) by admixing water at 90° C. or higher;

(c) separating the mixture of water and the reaction solution generated in step (b) into an organic solvent solution layer and an aqueous solution layer;

(d) isolating each of the organic solvent solution and the aqueous solution individually; and (e) performing a series of steps of:
 (e-1) washing the isolated organic solvent solution by admixing water at 90° C. or higher,
 (e-2) separating the mixture of the organic solvent solution and water generated in the above-mentioned washing step into an organic solvent solution layer and an aqueous solution layer, and
 (e-3) isolating each of the organic solvent solution and the aqueous solution that are separated into layers, being carried out once or more and recovering the (meth)acrylate-based polymer from the organic solvent solution isolated in the final step.

The present invention further relates to (3) the method of obtaining a (meth)acrylate-based polymer according to the above (1) or (2), in which the metal compound is an organoaluminum compound and a polymerization initiator composed of an organic alkali metal compound, (4) the method of obtaining a (meth)acrylate-based polymer according to any of the above (1) to (3), in which an acid is brought into contact with the metal component derived from the metal compound present in the reaction solution in step (a), (5) the method of obtaining a (meth)acrylate-based polymer according to any of the above (1) to (4), in which the acid added in step (a) is a carboxylic acid having a water content of 20% by mass or less, (6) the method of obtaining a (meth)acrylate-based polymer according to any one of the above (1) to (5), in which the water-insoluble organic solvent is a hydrocarbon, (7) the method of obtaining a (meth)acrylate-based polymer according to any of the above (1) to (6), in which step (b) and step (e-1) of step (e) are carried out in a temperature range of 90 to 180° C. and (8) the method of obtaining a (meth)acrylate-based polymer according to any of the above (1) to (7), in which step (b) and step (e-1) of step (e) are carried out by admixing 0.1 to 10 parts by volume of water to 1 part by volume of the reaction solution or the isolated organic solvent solution.

In addition, the present invention relates to
(9) the method of obtaining a (meth)acrylate-based polymer according to any of the above (3) to (8), in which the organoaluminum compound is represented by the following general formula (I),

(in the formula, $R^1$, $R^2$ and $R^3$ are each independently an alkyl group optionally having a substituent, cycloalkyl group optionally having a substituent, aryl group optionally having a substituent, aralkyl group optionally having a substituent, alkoxy group optionally having a substituent, aryloxy group optionally having a substituent, N,N-disubstituted amino group or $R^1$ is any one of the above groups and $R^2$ and $R^3$ are bonded together to form an arylenedioxy group optionally having a substituent;

(10) the method of obtaining a (meth)acrylate-based polymer according to any of the above (1) to (9), in which the (meth) acrylate-based polymer is a polymethacrylate, a diblock copolymer composed of a methacrylate-based polymer block and an acrylate-based polymer block or a triblock copolymer composed of a methacrylate-based polymer block, an acrylate-based polymer block and a methacrylate-based polymer block; and

(11) the method of obtaining a (meth)acrylate-based polymer according to any of the above (1) to (10), in which a series of the above steps of obtaining the (meth)acrylate-based polymer from the reaction solution containing the (meth)acrylate-based polymer is carried out through a continuous process.

The present invention further relates to
(12) a (meth)acrylate-based polymer obtained by any of the methods according to the above (1) to (11) having a haze value of 5% or less measuring a molding sample having a 3 mm-thick ness.

Effect of the Invention

According to the method of the present invention, a (meth) acrylate-based polymer having high purity and excellent characteristics such as transparency, heat resistance, mechanical properties and others is obtained efficiently and smoothly by removing, metal components to a high degree, present in a reaction solution containing the (meth)acrylate-based polymer obtained by polymerizing a (meth)acrylate in the presence of a metal compound, by using a method simpler than conventional methods.

The method of the present invention may in particular surely and highly remove, by a simpler method than conventional ones, an alkali metal component and an aluminum component present in a reaction solution containing the (meth)acrylate-based polymer obtained by polymerizing a (meth)acrylate in the presence of a polymerization initiator, particularly the polymerization initiator composed of an organic alkali metal compound and an organoaluminum compound, thereby efficiently and smoothly yielding the (meth) acrylate-based polymer of the present invention having high purity and high transparency as well as excellent heat resistance, mechanical properties and others.

BEST MODE FOR CARRYING OUT THE INVENTION

The present invention is described in detail below.
The method of the present invention may be applied to any reaction solution so far as the reaction solution contains a (meth)acrylate-based polymer obtained by polymerizing a monomer composed mainly of a (meth)acrylate in a water-insoluble organic solvent in the presence of a metal compound.

In such a case, the metal compound present in the polymerization system in which the monomer composed mainly of a (meth)acrylate is polymerized in the water-insoluble organic solvent includes a polymerization initiator such as an organic alkali metal compound and a metal halides such as a copper halide, an iron halide, a nickel halide and the like and an organoaluminum compound.

Above all, the method of the present invention is suitable as a method of obtaining a (meth)acrylate-based polymer from a reaction solution containing the (meth)acrylate-based polymer formed by a polymerization of a monomer composed mainly of a (meth)acrylate in the presence of a polymerization initiator composed of an organic alkali metal compound and an organoaluminum compound in a water-insoluble organic solvent.

The organoaluminum compounds to be present in the polymerization system in polymerization of a monomer composed mainly of a methacrylate is not particularly limited, and includes those used for certain purposes in polymerization of the monomer composed mainly of a (meth)acrylate (for example, for the purpose of improving efficiency in polymerization initiation, improving living characteristics during polymerization, increasing the rate of polymerization, broadening the kind of usable polymerization initiator, moderating polymerization conditions, improving the polymer yield, increasing the proportion of a block copolymer formed, controlling stereoregularity and others) and those used as a catalyst component in hydrogenation of a carbon-carbon double bond present in the (meth)acrylate-based polymer.

A typical example of the organoaluminum compounds present in polymerization of the monomer composed mainly of a (meth)acrylate include, but not limited to an organoaluminum compound represented by the following general formula (I),

(in the formula, $R^1$, $R^2$ and $R^3$ are the same as defined above.)

Alkyl groups represented by $R^1$, $R^2$ and $R^3$ in the above general formula (I) include methyl, ethyl, n-propyl, isopropyl, n-butyl, isobutyl, s-butyl, t-butyl, 2-methylbutyl, 3-methylbutyl, n-octyl, 2-ethylhexyl and the like. Cycloalkyl groups represented by $R^1$, $R^2$ and $R^3$ include cyclopentyl, cyclohexyl and the like. The above alkyl and cycloalkyl groups may optionally have one kind or two or more kinds of substituents, for example, an alkoxy group such as methoxy, ethoxy, isopropoxy, t-butoxy and the like and halogen atoms such as a chlorine, bromine, iodine atom and the like.

Aryl or aralkyl groups represented by $R^1$, $R^2$ and $R^3$ include aryl groups such as phenyl, naphthyl and the like and aralkyl groups such as benzyl, 1-phenylethyl and the like. The above aryl or aralkyl groups may optionally have one kind or two or more kinds of substituents, for example, alkyl groups such as methyl, ethyl, n-propyl, isopropyl, n-butyl, isobutyl, s-butyl, t-butyl, 2-methylbutyl, 3-methylbutyl, n-octyl, 2-ethylhexyl and the like, alkoxy groups such as methoxy, ethoxy, isopropoxy, t-butoxy and halogen atoms such as a chlorine, bromine, iodine atom and the like.

Alkoxy, aryloxy or N,N-disubstituted amino groups represented by $R^1$, $R^2$ and $R^3$ include alkoxy groups such as methoxy, ethoxy, isopropoxy, t-butoxy and the like, aryloxy groups such as phenoxy, 2-methylphenoxy, 4-methylphenoxy, 2,6-dimethylphenoxy, 2,4-di-t-butylphenoxy, 2,6-di-t-butylphenoxy, 2,6-di-t-butyl-4-methylphenoxy, 7-methoxy-2-naphthoxy and the like, and N,N-disubstituted amino groups such as methylamino, diethylamino, diisopropylamino, bis(trimethylsilyl)amino and the like. The above alkoxy, aryloxy or N,N-disubstituted amino groups may optionally have one kind or two or more kinds of substituents, for example, alkyl groups such as methyl, ethyl, n-propyl, isopropyl, n-butyl, isobutyl, s-butyl, t-butyl, 2-methylbutyl, 3-methylbutyl, n-octyl, 2-ethylhexyl and the like, alkoxy groups such as methoxy, ethoxy, isopropoxy, t-butoxy and the like and halogen atoms such as a chlorine, bromine, iodine atom and the like.

A specific example in which $R^2$ and $R^3$ form an arylenedioxy group includes a bifunctional group derived from 2,2'-bisphenol, 2,2'-methylenebisphenol, 2,2'-methylenebis(4-methyl-6-t-butylphenol), (R)-(+)-1,1'-bi-2-naphthol, (S)-(−)-1,1'-bi-2-naphthol and the like. These groups may optionally have one kind or two or more kinds of substituents, for example, alkyl groups such as methyl, ethyl, n-propyl, isopropyl, n-butyl, isobutyl, s-butyl, t-butyl, 2-methylbutyl, 3-methylbutyl, n-octyl, 2-ethylhexyl and the like, alkoxy groups such as methoxy, ethoxy, isopropoxy, t-butoxy and the like and halogen atoms such as a chlorine, bromine, iodine atom and the like.

Organoaluminum compounds, in which one or more among $R^1$, $R^2$ and $R^3$, particularly two among $R^1$, $R^2$ and $R^3$ of the above general formula (I) are an aryloxy group optionally having a substituent are preferably used in the present invention from the viewpoint of increasing the living characteristics in polymerization reaction of the (meth)acrylate.

The case exemplified above, in which $R^2$ and $R^3$ are joined to form the arylenedioxy group may also increase the living characteristics in polymerization reaction of the (meth)acrylate.

Specific examples of the organoaluminum compounds preferably used from the viewpoint of increasing the living characteristics in polymerization reaction of the (meth)acrylate include diethyl(2,6-di-t-butyl-4-methylphenoxy)aluminum, diethyl(2,6-di-t-butylphenoxy)aluminum, diisobutyl(2,6-di-t-butyl-4-methylphenoxy)aluminum, diisobutyl(2,6-di-t-butylphenoxy)aluminum, di-n-octyl(2,6-di-t-butyl-4-methylphenoxy)aluminum, di-n-octyl(2,6-di-t-butylphenoxy)aluminum, ethylenebis(2,6-di-t-butyl-4-methylphenoxy)aluminum, ethylenebis(2,6-di-t-butylphenoxy)aluminum, ethyl[2,2'-methylenebis(4-methyl-6-t-butylphenoxy)]aluminum, isobutylbis(2,6-di-t-butyl-4-methylphenoxy)aluminum, isobutylbis(2,6-di-t-butylphenoxy)aluminum, isobutyl[2,2'-methylenebis(4-methyl-6-t-butylphenoxy)]aluminum, n-octylbis(2,6-di-t-butyl-4-methylphenoxy)aluminum, n-octylbis(2,6-di-t-butylphenoxy)aluminum, n-octyl[2,2'-methylenebis(4-methyl-6-t-butylphenoxy)]aluminum, methoxybis(2,6-di-t-butyl-4-methylphenoxy)aluminum, methoxybis(2,6-di-t-butylphenoxy)aluminum, methoxybis[2,2'-methylenebis(4-methyl-6-t-butylphenoxy)]aluminum, ethoxybis(2,6-di-t-butylphenoxy)aluminum, ethoxy[2,2'-methylenebis(4-methyl-6-t-butylphenoxy)]aluminum, isopropoxybis(2,6-di-t-butyl-4-methylphenoxy)aluminum, isopropoxybis(2,6-di-t-butylphenoxy)aluminum, isopropoxybis[2,2'-methylenebis(4-methyl-6-t-butylphenoxy)]aluminum, t-butoxybis(2,6-di-t-butyl-4-methylphenoxy)aluminum, t-butoxybis(2,6-di-t-butylphenoxy)aluminum, t-butoxybis[2,2'-methylenebis(4-methyl-6-t-butylphenoxy)]aluminum, tris(2,6-di-t-butyl-4-methylphenoxy)aluminum, tris(2,6-di-t-butylphenoxy) aluminum and the like. These organoaluminum compounds may be used singly or in a mixture of two or more kinds.

The present invention may be applied for obtaining a (meth)acrylate-based polymer from any one of the reaction solution, in which a monomer composed mainly of a (meth) acrylate is polymerized in the presence of a polymerization initiator and one kind or two or more kinds of the above organoaluminum compounds or other organoaluminum compounds.

Kinds of polymerization initiators used in polymerization of the (meth)acrylate are not particularly limited, and there may be any one of the polymerization initiators conventionally used in polymerization of a monomer composed mainly of a (meth)acrylate. It has been widely known conventionally that anionic polymerization initiators, for example, organolithium compounds, organosodium compounds, organopotassium compounds, organomagnesium compounds and the like and living polymerization initiators such as copper halides, iron halides, nickel halides and the like have been used in polymerization of a (meth)acrylate and the present invention may be applied as a method of obtaining a (meth) acrylate-based polymer from a reaction solution containing the (meth)acrylate-based polymer polymerized in the presence of the metal-containing polymerization initiator described above.

Among them, the present invention is effective as a method of obtaining a (meth)acrylate-based polymer from a reaction solution containing the (meth)acrylate-based polymer polymerized in the presence of the anionic polymerization initiator and the organoaluminum compound.

Organolithium compounds used as the initiator of anionic polymerization of the monomer composed mainly of a (meth) acrylate include alkyllithiums and alkyldilithiums such as methyllithium, ethyllithium, n-propyllithium, isopropyllithium, n-butyllithium, s-butyllithium, isobutyllithium, t-butyllithium, n-pentyllithium, n-hexyllithium, tetramethylenedilithium, pentamethylenedilithium, hexamethylenedilithium and the like; aryllithiums and aryldilithiums such as phenyllithium, m-tolyllithium, p-tolyllithium, xylyllithium, naphthyllithium and the like; aralkyllithiums and aralkyldilithiums such as benzyllithium, diphenylmethyllithium, trityllithium, 1,1-diphenyl-3-methylpentyllithium, α-methylstyryllithium, a dilithium compound formed by reaction of diisopropenylbenzene with butyllithium and the like; lithium amides such as lithium dimethylamide, lithium diethylamide, lithium diisopropylamide and the like; lithium alkoxides such as lithium methoxide, lithium ethoxide, lithium n-propoxide, lithium isopropoxide, lithium n-butoxide, lithium s-butoxide, lithium t-butoxide, lithium pentyloxide, lithium hexyloxide, lithium heptyloxide, lithium octyloxide and the like; lithium phenoxide, lithium 4-methylphenoxide, lithium benzyloxide, lithium 4-methylbenzyloxide and the like.

Organosodium compounds used as an initiator of anionic polymerization of the monomer composed mainly of a (meth) acrylate include alkylsodiums and alkyldisodiums such as methylsodium, ethylsodium, n-propylsodium, isopropylsodium, n-butylsodium, s-butylsodium, isobutylsodium, t-butylsodium, n-pentylsodium, n-hexylsodium, tetramethylenedisodium, pentamethylenedisodium, hexamethylenedisodium and the like; arylsodiums and aryldisodiums such as phenylsodium, m-tolylsodium, p-tolylsodium, xylylsodium, naphthylsodium and the like; aralkylsodiums and aralkyldisodiums such as benzylsodium, diphenylmethylsodium, tritylsodium, 1,1-diphenyl-3-methylpentylsodium, α-methylstyrylsodium, a disodium compound formed by reaction of diisopropenylbenzene with butylsodium, sodium amides such as sodium dimethylamide, sodium diethylamide, sodium diisopropylamide and the like; sodium alkoxides such as sodium methoxide, sodium ethoxide, sodium n-propoxide, sodium isopropoxide, sodium n-butoxide, sodium s-butoxide, sodium t-butoxide, sodium pentyloxide, sodium hexyloxide, sodium heptyloxide, sodium octyloxide and the like; sodium phenoxide, sodium 4-methylphenoxide, sodium benzyloxide, sodium 4-methylbenzyloxide and the like.

Organopotassium compounds used as an initiator of anionic polymerization of a monomer composed mainly of a (meth)acrylate include alkylpotassiums and alkyldipotassiums such as methylpotassium, ethylpotassium, n-propylpotassium, isopropylpotassium, n-butylpotassium, s-butylpotassium, isobutylpotassium, t-butylpotassium, n-pentylpotassium n-hexylpotassium, tetramethylenedipotassium, pentamethylenedipotassium, hexamethylenedipotassium and the like; arylpotassiums and aryldipotassiums such as phenylpotassium, m-tolylpotassium, p-tolylpotassium, xylylpotassium, naphthylpotassium and the like; aralkylpotassiums and aralkyldipotassiums such as benzylpotassium, diphenylmethylpotassium, tritylpotassium, 1,1-diphenyl-3-methylpentylpotassium, α-methylstyrylpotassium, a dipotassium compound formed by reaction of diisopropenylbenzene with butylpotassium; potassium amides such as potassium dimethylamide, potassium diethylamide, potassium diisopropylamide and the like; potassium alkoxides such as potassium methoxide, potassium ethoxide, potassium n-propoxide, potassium isopropoxide, potassium n-butoxide, potassium s-butoxide, potassium t-butoxide, potassium pentyloxide, potassium hexyloxide, potassium heptyloxide, potassium octyloxide and the like; potassium phenoxide, potassium 4-methylphenoxide, potassium benzyloxide, potassium 4-methylbenzyloxide and the like.

Organomagnesium compounds used as an initiator of anionic polymerization of a monomer composed mainly of a (meth)acrylate include dimethylmagnesium diethylmagnesium, dibutylmagnesium, ethylbutylmagnesium, methylmagnesium bromide, ethylmagnesium chloride, ethylmagnesium bromide, phenylmagnesium chloride, phenylmagnesium bromide, t-butylmagnesium chloride, t-butylmagnesium bromide and the like.

One kind or two or more of kinds the polymerization initiators described above may be used in the polymerization of a monomer composed mainly of a (meth)acrylate in the presence of the organoaluminum compound. High efficiency of initiation of polymerization and also smooth progress of the polymerization reaction may be provided by using the organolithium compounds, particularly, one kind or two or more kinds of n-butyllithium, s-butyllithium, t-butyllithium, diphenylmethyllithium, 1,1-diphenyl-3-methylpentyllithium and α-methylstyryllithium.

The amount of the polymerization initiator used is not particularly limited and may be adjusted depending on such polymerization conditions and the like as the kind of (meth)acrylate used, the kind of (meth)acrylate-based polymer produced, the polymerization temperature and others, and the concentration of the polymerization initiator is generally in a range of preferably 0.1 to 100 mmol, and particularly preferably 1 to 10 mmol in 1 liter of the polymerization solution from the viewpoint of smooth progress of the polymerization.

Also, the amount of the organoaluminum compound used is in a range of preferably 0.1 to 30 mol times, and particularly preferably 0.5 to 20 mol times the amount of the polymerization initiator used from the viewpoint of improving the efficiency of the polymerization initiation and improving the living characteristics in polymerization.

In manufacturing the (meth)acrylate-based polymer, there may be used a monomer composed mainly of a (meth)acrylate, in general a monomer having a proportion of the (meth)acrylate relative to a total mass of the monomer at preferably 60% by mass or more, more preferably 75% by mass or more, and particularly preferably 85 to 100% by mass from the viewpoint of realizing the characteristics derived from the (meth)acrylate-based polymer.

Specific examples of the (meth)acrylate as a raw material to produce the (meth)acrylate-based polymer include methacrylates such as methyl methacrylate, ethyl methacrylate, propyl methacrylate, isopropyl methacrylate, allyl methacrylate, n-butyl methacrylate, t-butyl methacrylate, cyclohexyl methacrylate, benzyl methacrylate, 2-ethylhexyl methacrylate, lauryl methacrylate, glycidyl methacrylate, trimethoxysilylpropyl methacrylate, methoxyethyl methacrylate, 2-(2-ethoxyethoxy)ethyl methacrylate, N,N-dimethylaminoethyl methacrylate, N,N-diethylaminoethyl methacrylate and the like; and acrylates such as methyl acrylate, ethyl acrylate, propyl acrylate, isopropyl acrylate, allyl acrylate, n-butyl acrylate, t-butyl acrylate, cyclohexyl acrylate, benzyl acrylate, 2-ethylhexyl acrylate, lauryl acrylate, glycidyl acrylate, trimethoxysilylpropyl acrylate, methoxyethyl acrylate, ethyl-2-(2-ethoxyethoxy)ethyl acrylate, N,N-dimethylaminoethyl acrylate, N,N-diethylaminoethyl acrylate and the like.

One kind or two or more kinds of the above (meth)acrylates may be used in manufacturing the (meth)acrylate-based polymer.

Also, if necessary, a small amount of a (meth)acrylate-based polymer having two or more carbon-carbon double bonds (the amount of 10 mol % or less per a total amount of the monomer in general) may be used together with the above monofunctional (meth)acrylate.

Examples of other monomers, which may be optionally used as a minor component together with the (meth)acrylate include olefin compounds such as ethylene, propylene, isobutylene and the like; conjugated dienes such as butadiene, isoprene and the like; aromatic vinyl compounds such as styrene, α-methylstyrene and the like; unsaturated carboxylic acids such as acrylic acid, methacrylic acid and the like; vinyl chloride; vinyl acetate and the like, and one kind or two or more kinds of these may be used.

A monomer composed mainly of a (meth)acrylate (hereinafter sometimes referred to as "(meth)acrylate-based monomer") is polymerized in a water-insoluble organic solvent.

Use of the water-insoluble organic solvent may well and efficiently remove an aluminum component derived from the organoaluminum compound and a metal component derived from the polymerization initiator present in a reaction solution containing the (meth)acrylate-based polymer from the reaction solution, thus enabling isolation of a high-purity (meth)acrylate-based polymer from the organic solvent layer.

When a (meth)acrylate-based monomer is polymerized in a water-soluble organic solvent or hydrophilic organic solvent, the aluminum component and other metal components are difficult to remove from the reaction solution generated by the polymerization reaction, thus making it difficult to isolate the (meth)acrylate-based polymer with high purity. Furthermore, when the reaction solution containing the (meth)acrylate-based polymer obtained by the polymerization is washed by adding water at a temperature of 90° C. or more and a mixed solution of the reaction solution and water generated in the washing treatment is then allowed to be separated into an organic solvent solution layer and an aqueous solution layer, the organic solvent solution layer does not clearly separate from the aqueous solution layer, and a cloudy intermediate layer is formed between the two layers. This results in failure in the removal of the aluminum component and other metal components derived from the polymerization initiator and smooth isolation of the (meth)acrylate-based polymer from the organic solvent solution and also in the decrease in the yield (isolation yield) of the (meth)acrylate-based polymer.

Specific examples of the water-insoluble organic solvents used in polymerization of the (meth)acrylate-based monomer include aromatic hydrocarbons such as benzene, toluene, ethylbenzene, xylene and the like, aliphatic hydrocarbons such as pentane, n-hexane, octane and the like, alicyclic hydrocarbons such as cyclopentane, methylcyclopentane, cyclohexane, methylcyclohexane, ethylcyclohexane and the like, and these hydrocarbons may be used singly or in a combination of two or more kinds. Among them, toluene, ethylbenzene, cyclohexane or a mixture thereof is preferably used from the viewpoint of high solubility of the (meth)acrylate-based polymer produced by polymerization, clear layer separation from water to enable isolation of the (meth)acrylate-based polymer having high purity in high yield, easy purification of the solvent recovered and others, and in particular toluene is more preferably used.

The water-insoluble organic solvent used for polymerization is preferably degassed and dehydrated in advance from the viewpoint of smooth progress of the polymerization reaction and smooth removal of the aluminum component and other metal components from the reaction solution containing the synthesized (meth)acrylate-based polymer (hereinafter the water-insoluble organic solvent is sometimes simply referred to as the "organic solvent").

Additives to maintain the activity of the living characteristics and to allow the polymerization to proceed rapidly may be added as needed to the polymerization system in polymerization of the (meth)acrylate-based monomer. Such additives include, for example, ether compounds such as dimethyl ether, dimethoxyethane, diethoxyethane, 12-crown-4 and the like; organic nitrogen-containing compounds such as triethylamine, N,N,N',N'-tetramethylethylenediamine, N,N,N',N", N"-pentamethyldiethyltriamine, 1,1,4,7,10,10-hexamethyltriethylenetriamine, pyridine, 2,2'-dipyridyl and the like; organic phosphorous compounds such as triethylphosphine, triphenylphosphine, 1,2-bis(diphenylphosphino)ethane and the like; inorganic salts such as lithium chloride, sodium chloride, potassium chloride and the like; alkali metal alkoxides such as lithium (2-methoxyethoxy)ethoxide, potassium t-butoxide and the like; quaternary ammonium salts or quaternary phosphonium salts such as tetraethylammonium chloride, tetraethylammonium bromide, tetraethylphosphonium chloride, tetraethylphosphonium bromide; and the like. Among them the ether compounds and organic nitrogen-containing compounds may maintain the activity of the living characteristics with a small amount and allow the polymerization to proceed more rapidly, and the organic nitrogen-containing compounds are more preferred from the viewpoint of smooth layer separation between an organic solvent layer and an aqueous layer, the yield of the (meth)acrylate-based polymer from the organic solvent layer, and others. When the additive is added in the polymerization reaction system, its amount is preferably in a range of 0.1 to 200 mmol, and particularly preferably in a range of 1 to 20 mmol relative to 1 liter of the polymerization solution.

The polymerization temperature in polymerizing the (meth)acrylate-based monomer may be appropriately determined in accordance with the kind of (meth)acrylate-based monomer, the monomer concentration in the organic solvent, the kinds of organoaluminum compound and polymerization initiator and others, and is not particularly limited. In general, the polymerization temperature of −80 to 100° C., and particularly −40 to 80° C. is preferably used from the viewpoint of the regulation of the structure of the (meth)acrylate-based polymer obtained and the stability at the growing polymer chain ends.

The kind and combination of the (meth)acrylate-based monomer used in the polymerization, the method or sequence of feeding the monomer to a polymerization reactor and others are not particularly limited, and there may be produced various (meth)acrylate-based polymers such as a homopolymer composed of one kind of the monomer among (meth)acrylates; a random copolymer, a tapered copolymer, a block copolymer or a graft copolymer composed of two or more kinds of the monomers among (meth)acrylates; a random copolymer, a tapered copolymer, a block copolymer, a graft copolymer and the like composed of one kind or two or more kinds among the (meth)acrylates and one kind or two or more kinds of other copolymerizable monomers and the like, depending on the kind, combination and feed sequence of the (meth)acrylate-based monomer. For example, when only one kind among the (meth)acrylates is fed into a polymerization reactor and polymerized, a reaction solution containing a homopolymer is generated and when a monomer mixture containing two or more kinds among the (meth)acrylates is prepared in advance to feed to the polymerization reactor to polymerize, a reaction solution containing a random copolymer or tapered copolymer is generated. Also, for example, when a specific (meth)acrylate is polymerized to produce a living polymer block A and another (meth)acrylate is then fed to form a polymer block B, there is generated a reaction solution containing an A-B type diblock copolymer in which the polymer block A is bonded with the polymer block B. Furthermore, when a specific (meth)acrylate is polymerized to produce a living polymer block A and another (meth)acrylate is then fed to form a polymer block B, followed by feeding the same (meth)acrylate as the one fed first to form the polymer block A to generate a reaction solution containing an A-B-A type triblock copolymer in which the polymer block A, polymer block B and polymer block A are bonded.

The isolation method of the present invention may be effectively applied to any one of the reaction solution containing one kind or two or more kinds of various (meth)acrylate-based polymers described above (homopolymer, random copolymer, tapered copolymer, block copolymer, graft copolymer and the like) to isolate from the reaction solution each of the high-purity (meth)acrylate-based polymers with an extremely low residual amount of the aluminum component and other metal components.

In particular, when the isolation method of the present invention is applied to a reaction solution containing a diblock copolymer composed of a methacrylate-based polymer block and an acrylate block (for example, polymethyl methacrylate-poly(n-butyl acrylate) diblock copolymer) obtained by block copolymerization of a (meth)acrylate-based monomer in the presence of a polymerization initiator and an organoaluminum compound, a reaction solution containing a triblock copolymer composed of a methacrylate-based polymer block, an acrylate-based polymer block and a methacrylate-based polymer block (for example, polymethyl methacrylate-poly-n-butyl acrylate-polymethyl methacrylate triblock copolymer) or a reaction solution containing a polymethacrylate (for example, polymethyl methacrylate and the like) obtained by homopolymerization of one kind among the methacrylates in the presence of a polymerization initiator and an organoaluminum compound, each reaction solution may efficiently and smoothly produce the highly pure diblock copolymer, triblock copolymer or polymethacrylate that contain small residual amount of the aluminum component derived from the organoaluminum compound and the metal component derived from the polymerization initiator such as the organic alkali metal compound and the like and are excellent in transparency, weatherability, heat resistance, mechanical properties, appearance and others.

In the present invention, if needed, a reaction solution containing the (meth)acrylate-based polymer may be subjected to hydrogenation reaction of the carbon-carbon double bonds present in the polymer as it is (hereinafter sometimes referred to as hydrogenation reaction). The (meth)acrylate-based polymer suitable for the hydrogenation reaction is in particular those having carbon-carbon double bonds in their structure, including the copolymers such as a random copolymer, an alternate copolymer, a block copolymer and the like with, for example, a conjugated diene compound such as butadiene, isoprene and the like and an ester compound having carbon-carbon double bonds such as allyl methacrylate, allyl acrylate, propenyl methacrylate, propenyl acrylate and the like.

Among them, the conjugated diene compound, which is an anionic polymerizable monomer similar to the (meth)acrylate-based monomer is useful as a copolymerizable monomer to supplement the degree of non-polarity of the (meth)acrylate-based polymer and improve weatherability of the polymer by hydrogenation reaction.

One of the hydrogenation catalysts used in hydrogenation reaction includes a Ziegler type catalyst, that is, a combination of an organonickel compound or organotitanium compound and an organoaluminum compound represented by the following general formula (II) (hereinafter simply referred to as "organoaluminum compound (II)",

(II)

(in the formula, $R^4$, $R^5$ and $R^6$ each independently represent an alkyl group optionally having a substituent, cycloalkyl group optionally having a substituent, aryl group optionally having a substituent or aryloxy group optionally having a substituent).

The alkyl group optionally having a substituent, cycloalkyl group optionally having a substituent, aryl group optionally having a substituent or aryloxy group optionally having a substituent represented by $R^4$, $R^5$ and $R^6$ in the above formula includes similar ones represented by $R^1$, $R^2$ and $R^3$ in the general formula (I) and their specific examples are similar to those described before.

Specific examples of the organoaluminum compound (II) used preferably includes trimethylaluminum, triethylaluminum, tri-n-butylaluminum, tri-s-butylaluminum, tri-t-butylaluminum, triisobutylaluminum, trioctylaluminum, tricylohexylaluminum and the like.

The isolation method of the present invention may be used for the reaction solution containing the organoaluminum compound (II) used in the above hydrogenation reaction carried out as needed to efficiently remove such organoaluminum compound (II) together with such organoaluminum compound used for the polymerization reaction.

The molecular weight and physical properties of the (meth) acrylate-based polymer isolated by the method of the present invention is not particularly limited and may be adjusted to meet their applications and intended use.

Each step in the isolation method of the present invention is described below.

Step (a)

In the present invention an acid is added to a reaction solution containing a (meth)acrylate-based polymer synthesized by polymerizing a (meth)acrylate-based monomer in the presence of a metal compound such as a polymerization initiator and an organoaluminum compound in a water-insoluble organic solvent.

The acid is added to the reaction solution containing the (meth)acrylate-based polymer preferably at a time when terminals of the (meth)acrylate-based polymer in the reaction solution are still in a state of living and the polymerization reaction is terminated upon addition of the acid and also there is produced an acid compound bound with the metal component present in the reaction solution, as a specific example, an acid compound bound with the aluminum component derived from the organoaluminum compound and the metal component derived from the polymerization initiator. When the acid is added to the reaction solution containing the (meth)acrylate-based polymer after the termination of polymerization by adding water or an alcohol such as methanol and the like, water-insoluble reaction products between the aluminum component derived from the organoaluminum compound and water or the alcohol such as methanol and the like (for example, a gel-like aluminum hydroxide) are formed in the case where the organoaluminum compound is included. Thus, in this case, the added acid no longer bonds with the aluminum component sufficiently and the aluminum component may not be fully removed from the reaction solution.

A carboxylic acid containing substantially no or little water is preferably used as the acid added to a reaction solution containing the (meth)acrylate-based polymer. In this case, the water content in the carboxylic acids is preferably 20% by mass or less, more preferably 3% by mass or less, even more preferably 2% by mass or less, particularly preferably 1% by mass or less, and most preferably 0.5% by mass or less. Specific examples of the carboxylic acid includes acetic acid (glacial acetic acid), propionic acid, butyric acid, valeric acid, caproic acid and the like and among them acetic acid (glacial acetic acid) is preferred from the viewpoint of ready availability, handling and others.

The amount of the acid added in step (a) is preferably sufficient enough to form some sort of acid compound after an aluminum component derived from the organoaluminum compound is brought into contact with the acid in order to fully remove the aluminum component from the reaction solution when the reaction solution contains an organoaluminum compound.

When a metal component derived from a polymerization initiator together with the aluminum component derived from the organoaluminum compound or a basic additive to promote the polymerization reaction is contained in a reaction solution containing a (meth)acrylate-based polymer, the metal component derived from the polymerization initiator and the basic additive also form an acid compound in step (a). For this reason, the amount of the acid added in step (a) is preferably sufficient enough to form the acid compound with a total basic component (a total of the aluminum component, the metal component derived from the polymerization initiator, other basic components and the like) present in the reaction solution containing the (meth)acrylate-based polymer, from the viewpoint of enhancing the removal ratio of the all basic components from the reaction solution.

The acid is generally added 1.3 to 4 times by mol, particularly 1.7 to 3 times by mol of a total amount of all the basic components present in the reaction solution.

The temperature of the reaction solution at a time when the acid is added to the reaction solution containing the (meth)acrylate-based polymer is preferably −80 to 60° C., and particularly preferably 25 to 60° C. from a viewpoint that the aluminum component and other basic components present in the reaction solution smoothly produce the acid compound.

When the acid is added, it is preferable to stir the solution after the acid is added to the reaction solution or to add the acid while stirring the reaction solution. In the present invention, the concentration of the (meth)acrylate-based polymer in the reaction solution may be adjusted as needed before step (a) or after step (a) but before step (b). The method of the present invention shows more remarkable effects when the (meth)acrylate-based polymer is isolated from a reaction solution containing the (meth)acrylate polymer in a high concentration. In general, the concentration of the (meth)acrylate-based polymer in the reaction solution at the time of being supplied to step (b) or step (e-1) (washing step) is preferably 10 to 50% by mass, and particularly preferably 15 to 35% by mass from the viewpoint of productivity, removal efficiency of impurities and others.

The concentration of the (meth)acrylate-based polymer in the reaction solution may be adjusted by adding the same or related water-insoluble organic solvent as that used in polymerization to the reaction solution to dilute or, oppositely, to concentrate by heating and distilling the reaction solution.

Step (b)

Water (hot water) is admixed with the reaction solution containing the (meth)acrylate-based polymer to which the acid is added in step (a) and the resulting solution is washed. In such step (b), the acid compound bound with the aluminum component and other basic components generated in the reaction solution by the addition of the acid are fully extracted and transferred into an aqueous layer to be removed from the reaction solution (organic solvent layer).

In step (b) water is required to be admixed with the reaction solution at a temperature of 90° C. or more in order to smoothly and fully extract and transfer the acid compound bound with the aluminum component and other basic components formed in the reaction solution into an aqueous layer and to separate smoothly into two layers of an organic solvent solution layer and an aqueous solution layer in the subsequent step (c).

When water is admixed with the reaction solution containing the (meth)acrylate-based polymer, even if the temperature of the water is above 90° C. or more, the temperature of the resultant liquid (the mixed liquid) would become lower than 90° C. if the temperature of the reaction solution is low. Consequently, the acid compound bound with the aluminum component and other basic components present in the reaction solution may not be extracted and transferred sufficiently into the water layer, and further the layer separation in step (c) may become poor. For this reason, both of the reaction solution and water are preferably heated to 90° C. or more in advance before mixing and then mixed together. When the water washing treatment in step (b) is carried out below 90° C., the aluminum component present in the reaction solution is not sufficiently extracted and transferred into the aqueous layer, and the residual amount of the aluminum component in the finally obtained (meth)acrylate-based polymer is increased, thus failing to obtain the (meth)acrylate-based polymer with high purity. Furthermore, increasing the frequency of washing with water does not improve the removal ratio of the aluminum component as expected. In addition, when the mixed solution of the reaction solution and water generated in step (b) is used to separate into two layers of an organic solvent solution layer and an aqueous solution layer in the subsequent step (c), the organic solvent solution layer and the aqueous solution layer do not separate clearly into two layers and a cloudy intermediate layer is generated between the two layers (a layer which contains the components insoluble both in the organic solvent solution layer and in aqueous layer, highly viscous polymers containing water and the like), resulting in difficulty in treatment operation in and after step (d) and also reduction of the yield and purity of the (meth)acrylate-based polymer.

On the other hand, the (meth)acrylate-based polymer present in the reaction solution tends to decompose or degrade when the temperature in step (b) is too high (thermal decomposition temperature of (meth)acrylate-based polymer is generally 250 to 300° C.). Furthermore, when the temperature in step (b) is too high, extremely high pressure to keep the reaction solution and water in a liquid state and an apparatus to withstand such high pressure are required, leading to a disadvantage in terms of the thermal efficiency and apparatus requirement. Further, solubility of water in the organic solvent solution layer becomes large. In addition, even if the temperature in step (b) is above 180° C., there is little effect on decreasing the residual amount of the aluminum component in the obtained (meth)acrylate-based polymer.

In view of these points, step (b) is carried out by adjusting the temperature of a mixed solution of the reaction solution and water preferably in a range of 90 to 180° C., more preferably in a range of 100 to 170° C., and even more preferably in a range of 120 to 160° C.

The temperature (mixing temperature and washing temperature) of 90° C. or more used in step (b) is generally higher than an azeotropic point of the water-insoluble organic solvent (for example, toluene) and water (for example, an azeotropic point of toluene and water is 85.0° C.), so that the organic solvent is or both organic solvent and water are vaporized when step (b) is carried out under atmospheric pressure. Both the reaction solution (organic solvent) and water are required to be mixed while keeping both in a liquid state without vaporization in order to carry out the washing treatment of step (b) smoothly and in this respect, step (b) is preferably carried out at a temperature of 90° C. or more under pressurized conditions that enable to keep the reaction solution, water and the mixed solution of both in a liquid state.

The amount of water to be admixed in step (b) may vary depending on the amount and the kind of (meth)acrylate-based polymer present in the reaction solution, the kind and amount of aluminum component derived from the organoaluminum compound, the metal component derived from the polymerization initiator, the kind of organic solvent, the temperature in step (b) and others. In general, washing is performed by adding 0.02 to 10 parts by volume, preferably 0.1 to 5 parts by volume, and particularly preferably 0.2 to 2 parts by volume of water to 1 part by volume of the reaction solution containing the (meth)acrylate-based polymer, from the viewpoint of good extraction and transfer of the acid compound bound with the aluminum component and other basic components present in the reaction solution into an aqueous layer, smooth layer separation between the organic solvent solution layer and the aqueous solution layer in the subsequent step (c), reduction of the amount of heat required for raising the temperature of water used, reduction of the amount of effluent discharged in the isolation method of the present invention, and others.

In step (b), water is admixed with the reaction solution containing the (meth)acrylate-based polymer preferably with stirring since the acid compound bound with the aluminum components and other basic components are favorably extracted and transferred into the aqueous layer. In such a case, a stirring apparatus which may fully stir a mixed solution of the reaction solution and water is preferably used, and any one of dynamic stirring apparatuses such as rotating stirring blades, pumps and others, static stirring apparatuses (static mixer) and stirred plate-type extraction towers may be used.

When stirring is too strong in step (b), emulsification occurs and so called "water entrapment", in which water gets mixed in the reaction solution (organic solvent solution) in a form of fine particles, resulting in the failure in removing impurities contained in the entrapped water. When water entrapment is intense, an intermediate layer is formed between the organic solvent solution layer and the aqueous solution layer, leading to poor removal of impurities such as metal components and others. On the other hand, when stirring is weak, the interface composed of the organic solvent solution layer and the aqueous solution layer is insufficiently renewed, leading to poor removal of impurities such as metal components and the like or a very long time is required to remove the impurities.

The intensity of stirring varies with the temperature at which step (b) is carried out and a stirring power (Sa) of 30 to 1000 w/m$^3$, particularly 80 to 500 w/m$^3$ are preferably used when a dynamic stirring apparatus such as rotational stirring blades, pumps and others are used. A selectable range of the stirring power (Sa) in dynamic stirring becomes wider as the temperature at which step (b) is carried out increases.

When step (b) is carried out under dynamic stirring at 90 to 120° C., the stirring power (Sa) used is preferably 30 to 500 w/m$^3$, particularly preferably 30 to 200 w/m$^3$ and when step (b) is carried out under dynamic stirring at 120 to 180° C., the stirring power (Sa) used is preferably 50 to 1000 w/m$^3$, and particularly preferably 80 to 500 w/m$^3$.

The stirring power (Sa) in dynamic stirring herein is calculated according to the following mathematical formula (i).

$$\text{Stirring power } (Sa) \text{ in dynamic stirring } (w/m^3) = P/V \quad \text{(i)}$$

(In the formula, P is the power required for stirring (w: watt) specific to each dynamic stirring apparatus and may be calculated by a general method based on chemical engineering as described in, for example, Non-Patent Document 1. V is an inner volume (m$^3$) of the apparatus (mixing apparatus) in which mixing is carried out.)

When step (b) is carried out under static stirring using a static stirring apparatus (static mixer) and the like, the stirring power (Sb) used is preferably 30 to 1000 w/m$^3$, and particularly 80 to 500 w/m$^3$. A selectable range of the stirring power (Sb) in static stirring becomes wider as the temperature at which step (b) is carried out gets higher. When step (b) is carried out under static stirring at 90 to 120° C., the stirring power (Sb) used is preferably 30 to 500 w/m$^3$, particularly preferably 30 to 200 w/m$^3$ and when step (b) is carried out under static stirring at 120 to 180° C., the stirring power (Sb) used is preferably 50 to 1000 w/m$^3$, and particularly preferably 80 to 500 w/m$^3$.

The stirring power (Sb) in static stirring herein is calculated according to the following mathematical formula (ii).

$$\text{Stirring power } (Sb) \text{ in static stirring } (w/m^3) = 2f\rho U^3/D \quad \text{(ii)}$$

(In the formula, f is a Fanning's friction coefficient, ρ is density (kg/m$^3$), U is an average flow velocity (m/sec) and D is a diameter of apparatus (m) and they may be calculated by a general method based on chemical engineering as described in, for example, Non-Patent Document 2.)

When calculation of the friction coefficient is difficult, the following mathematical formula (iii) may be used for calculation assuming that a pressure drop applied to the system is converted to a mixing energy.

$$\text{Stirring power } (Sb) \text{ in static stirring } (w/m^3) = \Delta P.A.U/V \quad \text{(iii)}$$

(In the formula, ΔP is a pressure drop (Pa) of an apparatus, A is a cross-sectional area (m$^2$), U is an average flow velocity (m/sec) and V is an inner volume (m$^3$) and they are calculated according to a general method based on chemical engineering.)

The mixing time (mixing time in stirring of a mixed solution of the reaction solution and water) in step (b) may vary depending on mixing methods, the temperature of a mixed solution, the viscosity of the reaction solution, the amount of acid compound bound with the aluminum component and other basic components present in the reaction solution, the amount of water admixed with the reaction solution and the like and is preferably 10 seconds to 300 minutes, and particularly preferably 1 to 180 minutes when carried out under dynamic stirring and similarly 10 seconds to 300 minutes, particularly 1 to 180 minutes when carried out under static stirring. By employing the mixing time described above, the acid compound bound with the aluminum component and other basic components present in the reaction solution is fully extracted and transferred into the aqueous layer and the capacity of mixing apparatus may be kept not excessively large and the apparatus may be simplified as well.

Step (c)

A mixed solution of water and the reaction solution containing a (meth)acrylate-based polymer generated in the above step (b) is separated in this step (c) into two layers of an organic solvent solution layer (upper layer) and an aqueous solution layer (lower layer).

This step (c) is generally carried out by allowing a mixed solution of water and the reaction solution containing the (meth)acrylate-based polymer generated in step (b) to settle.

In the present invention, an acid containing substantially no or little water is added in step (a) to the reaction solution containing the (meth)acrylate-based polymer, and a water washing treatment is performed in step (b) at 90° C. or more, preferably at a high temperature of 120° C. to 160° C. to prevent the formation of a gel-like product and the like that interfere with the layer separation. Therefore, the mixed solution of water and the reaction solution generated in step (b) is clearly separated in this step (c) into two layers of an organic solvent solution layer and an aqueous solution layer without forming a cloudy intermediate layer after settling for a few minutes to about 120 minutes.

The temperature of a mixed solution of water and a reaction solution at which step (c) is carried out is preferably similar to the temperature at which step (b) is carried out.

For example, when an organic solvent solution is isolated in step (d) following step (c) and the organic solvent is distilled off from the organic solvent solution to isolate the (meth)acrylate-based polymer, it is advantageous to carry out step (c) (settling-layer separation) while keeping the liquid temperature at 90° C. or more from the viewpoint of thermal efficiency in isolating the (meth)acrylate-based polymer from the organic solvent solution isolated in the subsequent step (d). When step (e) (steps of water washing-layer separation-isolation of the organic solvent solution) described later is further carried out after the organic solvent solution is isolated in step (d) after step (c), it is also advantageous to carry out step (c) (settling-layer separation) while maintaining the solution temperature at 90° C. or more considering the thermal efficiency and others in the water washing treatment in step (e). When the organic solvent solution is poured into a poor solvent such as methanol and the like to precipitate and isolate the (meth)acrylate-based polymer after separating the organic solvent solution in the step (d) after this step (c), step (c) is preferably carried out by keeping the solution temperature at 90° C. or more.

Step (d)

In the above step (c), since a mixed solution of water and the reaction solution containing the (meth)acrylate-based polymer is separated into two layers of an upper layer composed of an organic solvent solution containing the (meth) acrylate-based polymer and a lower layer composed of an aqueous solution containing the aluminum component or other metal components and the like, the organic solvent solution containing the (meth)acrylate-based polymer and the aqueous solution containing the aluminum component or other metal components and the like are separated and isolated individually (isolation).

The method of separating and isolating individually the organic solvent solution and the aqueous solution is not particularly limited and any method conventionally used to separate and isolate each fraction from a solution separated into two layers may be used.

For example, when the above step (c) is carried out in a predetermined vessel, an aqueous solution is withdrawn from the bottom or a lower section of the vessel, while an organic solvent solution is withdrawn from an upper section of the vessel, enabling separation and isolation of each solution. For example, the above step (c) may also be carried out by using a vessel divided into two sections by a dividing wall having a predetermined height up to a halfway height of the vessel. A mixed solution of water and the organic solvent solution is introduced into one chamber of the vessel and is allowed to settle. The aqueous solution settled in a lower layer in the one chamber is stocked to a height equal to or less than the height of the dividing wall, and the organic solvent solution settled in an upper layer is flown over the dividing wall into the other chamber. Then, the aqueous solution is withdrawn from the bottom or lower section of the above one chamber while the organic solvent solution is withdrawn from the other chamber.

The organic solvent solution containing the (meth)acrylate-based polymer isolated in step (d) may be directly subjected to an isolation step of the (meth)acrylate-based polymer as it is in accordance with applications and intended use of the (meth)acrylate-based polymer, or step (e) described later (steps of water washing-layer separation-isolation of the organic solvent solution) may be carried out once or twice or more to further decrease the residual amount of the aluminum component and other metal components in the (meth)acrylate-based polymer.

When the (meth)acrylate-based polymer is directly isolated from the organic solvent solution containing the (meth) acrylate-based polymer isolated in step (d), there may be used any conventionally known method for isolation of a (meth) acrylate-based polymer from an organic solvent solution. The method includes, but not limited to, for example, a method of obtaining the (meth)acrylate-based polymer through precipitation by mixing the organic solvent solution containing the (meth)acrylate-based polymer and an organic solvent (poor solvent) such as methanol and the like not dissolving the (meth)acrylate-based polymer, a method of distilling off an organic solvent from the organic solvent solution containing the (meth)acrylate-based polymer, or the like. The method of distilling off the organic solvent from the organic solvent solution is not particularly limited and includes, but not limited to, for example, a method of concentrating and drying by performing distillation of the organic solvent by heating and evacuating in a stirring vessel, a method of removing the organic solvent with an extruder and others, a steam stripping method, a spray drying method and others.

The (meth)acrylate-based polymer isolated from the organic solvent solution may be used as it is or after washing, drying and others as needed.

Further, the aqueous solution containing the aluminum component or other metal components isolated in step (d) may be subjected to a purification treatment to remove these components depending on the kind and volume of the metal components present in the aqueous solution as needed and may be reused in the isolation method of the present invention, in other applications or discharged.

Step (e)

When isolation of a (meth)acrylate-based polymer with higher purity and a further reduced residual amount of the aluminum component and other metal components is required in accordance with applications and intended use of the (meth)acrylate-based polymer, this step (e) is further carried out once or twice or more after the above step (d) (isolation step of the organic solvent solution containing the (meth) acrylate-based polymer), followed by obtaining the (meth) acrylate-based polymer from the organic solvent solution obtained in the final step, thus enabling to obtain a (meth) acrylate-based polymer with higher purity.

This step (e) is composed of a series of steps of: washing the isolated organic solvent solution by admixing water at a temperature of 90° C. or more (e-1), separating the mixed solution of the organic solvent solution and water generated in the washing into an organic solvent solution layer and an aqueous solution layer (e-2), and isolating each of the organic solvent solution and the aqueous solution that are separated into layers (e-3).

The frequency of carrying out step (e) may appropriately be selected depending on the purity and others of the (meth) acrylate-based polymer required and is generally in a range of 1 to 5 times, further in a range of 1 to 4 times, particularly in a range of 1 to 3 times from the viewpoint of the purity of the (meth)acrylate-based polymer required in the market, the cost for obtaining the (meth)acrylate-based polymer, the size of isolation facilities, the volume of waste water and others.

When step (e) is carried out twice after step (d), a high-purity (meth)acrylate-based polymer with the removal ratio of the aluminum component at 85% or more may be obtained. In particular, when the operation is carried out at 110° C. or more, step (e) carried out twice may yield a high purity (meth)acrylate-based polymer in which the removal ratio of the aluminum component is generally 90% or more.

In the above step (e-1) of step (e), to an organic solvent solution containing the (meth)acrylate-based polymer isolated in the above step (d), the organic solvent solution containing the (meth)acrylate-based polymer isolated in the first run of step (e) (when step (e) is carried out twice), the organic solvent solution containing the (meth)acrylate-based polymer isolated in the second run of step (e) (when step (e) is carried out three times), the organic solvent solution containing the (meth)acrylate-based polymer isolated in the third run of step (e) (when step (e) is carried out four times) and others, water is admixed at a temperature of 90° C. or more (at a temperature of preferably 90 to 180° C., more preferably 95 to 160° C., and even more preferably 110 to 150° C.) similarly to the above step (b) to extract and transfer the aluminum component, the alkali metal component, other metal components and the acid compound thereof still remaining in the organic solvent solution containing the (meth)acrylate-based polymer into the aqueous solution layer.

It is preferred in these cases to heat both water and the organic solvent solution containing the (meth)acrylate-based polymer to a temperature of 90° C. or more in advance before mixing and then mix both similarly to the above step (b).

Further, step (e-1) of step (e) is preferably carried out at a temperature of 90° C. or more under pressurized conditions to keep both water and the organic solvent solution containing the (meth)acrylate-based polymer in a liquid state similarly to step (b).

The amount of water admixed in step (e-1) of step (e) may vary in accordance with various circumstances and is generally 0.1 to 10 parts by volume, preferably 1 to 5 parts by volume, and particularly preferably 1 to 2 parts by volume relative to 1 part by volume of the organic solvent solution containing the (meth)acrylate-based polymer from the viewpoint of good extraction and transfer of the aluminum component, other basic components and acid compound thereof remaining in the organic solvent solution into the aqueous layer, smooth layer separation into the organic solvent solution layer and the aqueous solution layer in the subsequent step (e-2), restraint of volume of effluent, control of the amount of heat required to raise the temperature of water used and others.

Water is admixed with an organic solvent solution containing the (meth)acrylate-based polymer in step (e-1) preferably with stirring similarly to step (b) from the viewpoint of good extraction and transfer of the acid compound bound with the aluminum component and other basic components into the aqueous layer. Any one of rotating stirring blades, other dynamic stirring apparatuses, static stirring apparatuses (static mixer) and stirred plate-type extraction towers may be used as a stirring apparatus.

When stirring is too strong in step (e-1), emulsification occurs and so called "water entrapment", in which water gets mixed in the reaction solution (organic solvent solution) in a form of fine particles, resulting in the failure to remove impurities contained in the entrapped water. When water entrapment is intense, an intermediate layer is formed between the organic solvent solution layer and the aqueous solution layer, leading to poor removal of impurities such as the metal components and the like. On the other hand, when stirring is weak, the interface composed of the organic solvent solution layer and the aqueous solution layer is insufficiently renewed, leading to poor removal of impurities such as the metal components and the like or requiring a very long time to remove the impurities.

Intensity of stirring varies with the temperature at which step (e-1) is carried out and a stirring power (Sa) of 30 to 1000 w/m³, and particularly 80 to 500 w/m³ is preferably used when a dynamic stirring apparatus such as rotating stirring blades, pumps and others are used. A selectable range of the stirring power (Sa) in dynamic stirring becomes wider as the temperature at which step (e-1) is carried out increases. In general, when step (e-1) is carried out under dynamic stirring at 90 to 120° C., the stirring power (Sa) used is preferably 30 to 500 w/m³, and particularly preferably 30 to 200 w/m³ and when step (e-1) is carried out under dynamic stirring at 120 to 180° C., the stirring power (Sa) used is preferably 50 to 1000 w/m³, and particularly preferably 80 to 500 w/m³.

The stirring power (Sa) in dynamic stirring herein is calculated according to the above mathematical formula (i).

When step (e-1) is carried out under static stirring using a static stirring apparatus (static mixer) and the like, the stirring power (Sb) used is preferably 30 to 1000 w/m³, particularly 80 to 500 w/m³. A selectable range of the stirring power (Sb) in static stirring becomes wider as the temperature at which step (e-1) is carried out increases. When step (e-1) is carried out under static stirring at 90 to 120° C., the stirring power (Sb) used is preferably 30 to 500 w/m³, and particularly preferably 30 to 200 w/m³, while when step (e-1) is carried out under static stirring at 120 to 180° C., the stirring power (Sb) used is preferably 50 to 1000 w/m³, and particularly preferably 80 to 500 w/m³.

The stirring power (Sb) in static stirring herein is calculated according to the above mathematical formulas (II) and (iii).

The mixing time per mixing in step (e-1) (the mixing time when step (e-1) is carried out only once and each mixing time when step (e-1) is carried out twice or more) may vary depending on the mixing method, the temperature of the mixed solution, the viscosity of the organic solvent solution containing the (meth)acrylate-based polymer, the amount of the acid compound bound with the aluminum component and other basic components present in the organic solvent solution containing the (meth)acrylate-based polymer, the amount of admixed water relative to the organic solvent solution containing the (meth)acrylate-based polymer and others and is preferably 10 seconds to 300 minutes, and particularly preferably 1 to 180 minutes when carried out under dynamic stirring as well as 10 seconds to 300 minutes, and particularly 1 to 180 minutes when carried out under static stirring. Adopting the mixing time described above makes it possible to fully extract and transfer the acid compound bound with the aluminum component and other basic components present in the reaction solution into an aqueous phase and keep the capacity of the mixing apparatus not excessive and simplify the apparatus as well.

The mixed solution of water and the organic solvent solution containing the (meth)acrylate-based polymer generated in the above step (e-1) is next separated in step (e-2) into two layers of an organic solvent solution layer (upper layer) and an aqueous solution layer (lower layer). Step (e-2) is generally carried out by allowing the mixed solution of water and the organic solvent solution containing the (meth)acrylate-based polymer generated in the above step (e-1) to settle. In step (e-2) the mixed solution of water and the organic solvent solution generated in the above step (e-1) is clearly separated into two layers of the organic solvent solution layer and the aqueous solution layer without forming a cloudy intermediate layer only by settling for a few minutes to about 30 minutes.

The temperature of the mixed solution of water and the reaction solution at which step (e-2) of step (e) is carried out is preferably similar to the temperature at which step (b) and step (c) are carried out. For example, when the organic solvent solution is isolated in the step (e-3) following step (e-2) to evaporate an organic solvent from the organic solvent solution to isolate the (meth)acrylate-based polymer, step (c) (settling step) is advantageously carried out while keeping the solution temperature at 90° C. or more from the viewpoint of thermal efficiency in isolating the (meth)acrylate-based polymer. When step (e-3) following step (e-2) is carried out to isolate the organic solvent solution containing the (meth) acrylate-based polymer and this step (e) is further repeated to the isolated organic solvent solution, step (e-3) is advantageously carried out while keeping the solution temperature at 90° C. or more considering the thermal efficiency in the water washing treatment in step (e) that is repeated further. When the organic solvent solution isolated in step (e-3) of step (e) is poured into a poor solvent such as methanol and the like to separate out and precipitate the (meth)acrylate-based polymer, step (e-3) is preferably carried out while keeping the liquid temperature at 90° C. or more.

Since the mixed solution of water and the organic solvent solution containing the (meth)acrylate-based polymer is separated in the above step (e-2) into two layers of an upper layer composed of an organic solvent solution containing the (meth)acrylate-based polymer and a lower layer composed of an aqueous solution containing the aluminum component, other metal components and the like, the organic solvent solution containing the (meth)acrylate-based polymer and the aqueous solution containing the aluminum component, other metal components and the like are each isolated in step (e-3) of step (e) (isolation).

The method of isolating each of the organic solvent solution and the aqueous solution is not particularly limited and any method conventionally used to isolate each of the solution separated into two layers may be used.

The method of obtaining the (meth)acrylate-based polymer from the organic solvent solution containing the (meth)acrylate-based polymer isolated in step (e-3) of step (e) is not particularly limited, and there may be used, for example, a method in which the organic solvent solution containing the (meth)acrylate-based polymer is mixed with an organic solvent (poor solvent) such as methanol and the like not dissolving the (meth)acrylate-based polymer to separate out and precipitate the (meth)acrylate-based polymer or a method in which an organic solvent is distilled off from the organic solvent solution containing the (meth)acrylate-based polymer.

The (meth)acrylate-based polymer isolated from the organic solvent solution may be used as it is or after washing, drying and others as needed.

The aqueous solution containing the aluminum component or other metal components and the like isolated in step (e-3) of step (e) may be subjected to a purification treatment as needed to remove these components depending on the kind and volume of the metal component present in the aqueous solution and may be reused in the isolation method of the present invention, in other applications or discharged.

In the present invention, the above step (a) to step (d) or step (a) to step (e) may be carried out in a batch method or in a continuous method. The above step (a) to step (c), step (a) and step (b), step (b) and step (c) or step (a) to step (e) may be carried out using the same vessel (same tank). Furthermore, for example, step (a), step (b) and step (c) may also be carried out using a first apparatus (vessel), a second apparatus (mixing apparatus) and a third apparatus (vessel), respectively, whereas step (a), step (b), step (c), step (e-1) of step (e) and step (e-2) of step (e) may be carried out using a first apparatus (vessel), a second apparatus (mixing apparatus), a third apparatus (vessel), a fourth apparatus (mixing apparatus) and a fifth apparatus (vessel), respectively.

A continuous method is preferred from the cost and size of manufacturing apparatuses and easiness of operation. The apparatuses in the continuous method are not particularly limited, and there may be employed a "mixer and settler" system in which a static mixer or tank-type vessel equipped with a stirrer is used as an apparatus of step (b), through which the solution obtained in step (a) is passed continuously and then a decanter is used as an apparatus of step (c) or a counter-current extraction tank or extraction tower and the like with or without stirring power. In the present invention, it is important to select an optimum condition in step (b) and in this regard a tank-type vessel with a stirrer is preferred because of their wide range of operational conditions.

When a (meth)acrylate-based polymer is obtained by the method of the present invention, metal impurities derived from a metal compound such as an aluminum compound, an organic alkali compound and the like are removed to a high degree, thereby yielding a high-quality (meth)acrylate-based polymer excellent in thermal stability, transparency and others. While transparency of the (meth)acrylate-based polymer is greatly affected by impurities such as a residual metal component, the (meth)acrylate-based polymer obtained by the isolation method of the present invention has small amount of impurities and extremely high transparency.

In the (meth)acrylate-based polymer obtained by the method of the present invention, the content of metal impurities derived from an aluminum compound, an alkali metal compound and other metal compounds is not particularly limited, but in order to obtain high transparency, the content of the aluminum component derived from the aluminum compound is, as the aluminum element content, preferably 400 ppm or less, more preferably 200 ppm or less, even more preferably 100 ppm or less, and particularly preferably 50 ppm or less based on the mass of the (meth)acrylate-based polymer. According to the method of the present invention, even a (meth)acrylate-based polymer with the content of the aluminum component at 50 ppm or less derived from the aluminum compound is obtained smoothly.

Further, in order for the (meth)acrylate-based polymer obtained to have high thermal stability, the content of the alkali metal component derived from the alkali metal compounds such as a lithium compound, a potassium compound and the like remaining in the (meth)acrylate-based polymer is, as the alkali metal element content, preferably 30 ppm or less, more preferably 10 ppm or less, even more preferably 5 ppm or less, and particularly preferably 2 ppm or less based on the mass of the (meth)acrylate-based polymer. According to the method of the present invention, even a (meth)acrylate-based polymer having the content of the alkali metal component derived from the alkali metal compounds at 2 ppm or less may be obtained smoothly.

The (meth)acrylate-based polymer obtained by the present invention has an extremely small amount of the metal components (metal impurities) derived from the metal compounds such as an aluminum compound, an alkali metal compound and the like and has excellent transparency. Transparency of the (meth)acrylate-based polymer may be set in accordance with applications and others. According to the present invention, a high-purity (meth)acrylate-based polymer having a haze value of 5% or less or further even 3% or less is obtained when formed into a 3 mm-thick molded article.

The above "haze value" in the present specification is the haze value of a 3 mm-thick molded article in accordance with JIS K7136 and the details of the measurement method are described in the following examples.

In a (meth)acrylate block copolymer having a diblock or triblock structure obtained by the reaction using an organoaluminum compound, in particular a diblock copolymer composed of a methacrylate-based polymer block and an acrylate-based polymer block and a triblock copolymer composed of a methacrylate-based polymer block, an acrylate-based polymer block and a methacrylate-based polymer block, a haze value of a 3 mm thick molded article is conventionally 10% or more in general. According to the present invention, however, a (meth)acrylate block copolymer having markedly higher transparency than the conventional (meth)acrylate block copolymer is provided.

EXAMPLE

The present invention is specifically explained with examples below but it is not limited by the following examples in any way.

The content of an aluminum component and an alkali metal component (lithium component) in the (meth)acrylate-based polymer (triblock copolymer or diblock copolymer) obtained in the following examples was measured as follows.

Measurement of the Content of Aluminum Component in (Meth)acrylate-Based Polymer About 5 g of the (meth)acrylate-based polymer obtained by isolation in the following Examples and Comparative Examples were collected and precisely weighed and placed in a measuring flask with a volume of 100 ml. In the flask, 10 ml of concentrated sulfuric acid was added and the polymer was treated under the conditions of 250 to 300° C. for about 2 hours (wet decomposition). Then, 5 ml of concentrated nitric acid was added to this solution, and the operation in which the resultant solution was treated under the conditions of 250 to 300° C. for about 2 hours (wet decomposition) was performed twice in total until the solution became pale yellow or clear and colorless. Further, 5 ml of perchloric acid was added to this solution, which was treated under the conditions of 250 to 300° C. for about 2 hours (wet decomposition). The measuring flask was then cooled to room temperature, to which distilled water was added to make the volume of solution precisely to 100 ml.

This solution was used as a specimen to determine the content of the aluminum component and alkali metal component (lithium component) using an Inductively-Coupled Plasma (ICP) emission spectrophotometer (IRIS/IRISAP made by Nippon Jarrel-Ash Co., Ltd., with argon plasma) (wavelength for aluminum=396.152 nm and wavelength for lithium=610.362 nm).

Measurement of Haze Value in the (Meth)acrylate-Based Polymer

Haze values were measured in accordance with JIS K7136.

Specifically, a part of an organic solvent solution containing the (meth)acrylate-based polymer (block copolymer) eventually obtained in the following Examples and Comparative Examples was isolated and dried at 60° C. for 8 hours in a vacuum oven to evaporate the volatile component and the (meth)acrylate-based polymer (block copolymer) thus obtained was used to press-mold under the conditions of temperature at 230° C. and pressure at 8.8 MPa to prepare a 3 mm-thick sheet and a haze value of the pressed sheet obtained was measured at the temperature of 25° C. using a haze meter (Direct Reading Haze Computer HGF-2DP made by Suga Test Instruments Co., Ltd.).

The number average molecular weight of the (meth)acrylate-based polymer (triblock copolymer or diblock copolymer) produced in the following Examples and Comparative Examples is measured by gel permeation chromatography (GPC) in tetrahydrofuran as a solvent calculated with a polystyrene standard reference.

Example 1

(1) Into a 1 L volume polymerization vessel in which the atmosphere was replaced by nitrogen 460 ml of dry toluene was charged, to which 10.5 ml of a toluene solution (concentration: 0.6 mol/L) of isobutylbis(2,6-di-t-butyl-4-methylphenoxy)aluminum (organoaluminum compound) was then added at room temperature (23° C.). This solution was chilled to 0° C., to which 2.0 mL of a cyclohexane solution of t-butyllithium (organolithium compound) (concentration: 1.3 mol/L) was added with stirring and after 10 minutes 19.9 ml of methyl methacrylate (MMA) was gradually added to initiate polymerization. The polymerization was continued for 2 hours after completion of the addition while maintaining the temperature at 0° C. Subsequently, the temperature in the polymerization vessel was chilled to −30° C. To this vessel, 134 ml of n-butyl acrylate (nBA) was added over 30 minutes. After completion of the addition, the solution was stirred at −30° C. for 10 minutes and the temperature was raised to 0° C. Here, 19.9 ml of methyl methacrylate (MMA) was added, and the resultant solution was stirred at 0° C. for about 10 minutes, and the temperature was raised to 25° C. While keeping it at same temperature, polymerization was performed for 5 hours. Subsequently, 7.2 ml (5.6 times by mol the amount required for neutralization of the organoaluminum compound and the organolithium compound used in the polymerization reaction) of acetic acid (water content: 0.1% by mass or less) was added to the reaction solution to terminate the polymerization reaction and to produce an acetic acid compound bound with the aluminum component and lithium component present in the reaction solution (volume of the reaction solution thus formed: 650 ml).

(2) A small amount (1 ml) of the reaction solution obtained in (1) above was withdrawn to evaporate the solvent under reduced pressure (267 Pa (2 Torr), 60° C., 24 hours), to obtain a polymer. GPC measurement showed that the resulting polymer was a triblock copolymer composed of polymethyl methacrylate (PMMA), polybutyl acrylate (PnBA), and polymethyl methacrylate (PMMA). The values of the number average molecular weight by GPC of the first PMMA, that of PnBA and that of the second PMMA in this triblock copolymer were 7600, 51000 and 7600, respectively and a mass ratio of each polymer block (PMMA/PnBA/PMMA) was 11.5/77/11.5. The content of the aluminum component in the triblock copolymer (about 100 mg) obtained was measured using the above method to give 1019 ppm.

(3) Into an autoclave A (inner volume, 1 L) equipped with a propeller-type stirrer, 300 ml of the reaction solution containing the triblock copolymer (PMMA-PnBA-PMMA triblock copolymer) after addition of acetic acid obtained in (1) above was charged and heated to 90° C.

(4) Into the above vessel A, 300 ml of distilled water was then introduced and heated in advance to 90° C. while stirring under pressurized conditions with heating and the resultant solution was mixed for 10 minutes (the number of revolution of the propeller in mixing: 700 rpm, pressure in vessel A: 0.4 MPa). The temperature of the mixed solution in the vessel A was kept at 90° C. during the stirring.

(5) After stirring was stopped to allow the mixed solution to settle in the vessel A (solution temperature during settling: 90° C.), the mixed solution was clearly separated into two layers, of which the upper layer was composed of an organic solvent solution and the lower layer was composed of an aqueous solution without forming an intermediate layer between the two layers in 30 minutes after stopping stirring.

(6) About 2 ml of the organic solvent solution from the upper layer (organic solvent solution layer) that was separated in (5) above was isolated and dried under reduced pressure (267 Pa (2 Torr), 60° C., 24 hours) to yield about 0.5 g of a PMMA-PnBA-PMMA triblock copolymer.

(7) The content of the aluminum component in the PMMA-PnBA-PMMA triblock copolymer obtained in (6) above was measured using the above method to give 377 ppm (the removal ratio of the aluminum component based on the content of the aluminum component in the PMMA-PnBA-PMMA triblock copolymer measured in (2) above: 63%).

Examples 2-6

(1) An operation similar to (1) and (3) to (6) in Example 1 was carried out except that in (3) and (4) in Example 1 the preheating temperature of the reaction solution to be charged into the autoclave, the water temperature and the temperature of the mixed solution when mixed in the vessel were changed to 100° C. (Example 2), 110° C. (Example 3), 130° C. (Example 4), 140° C. (Example 5) and 150° C. (Example 6), respectively.

(2) The content of the aluminum component in the PMMA-PnBA-PMMA triblock copolymer obtained in each Example was measured using the above method and the results were shown in the following Table 1.

Comparative Examples 1 and 2

(1) An operation same to (1) and (3) to (6) in Example 1 was carried out except that in (3) and (4) in Example 1 the preheating temperature of the reaction solution to be charged into the autoclave and the water temperature and the temperature of the mixed solution when mixed in the vessel were changed to 60° C. (Comparative Example 1) and 80° C. (Comparative example 2), respectively. In these Comparative Examples 1 and 2, after washing the reaction solution by admixing water and the mixed solution was then allowed to settle for layer separation, the organic solvent solution layer and the aqueous solution layer were not fully separated into layers after allowing to settle for 1 hour after stopping stirring. Furthermore, a cloudy intermediate layer was formed between the upper layer composed of the organic solvent solution and the lower layer composed of the aqueous solution in both Comparative Example 1 and Comparative Example 2.

(2) About 2 ml of the organic solvent solution from the upper layer (organic solvent solution layer) in (1) above was isolated and dried under reduced pressure (267 Pa (2 Torr), 60° C., 24 hours) to yield about 0.5 g of a PMMA-PnBA-PMMA triblock copolymer. The content of the aluminum component in the PMMA-PnBA-PMMA triblock copolymer obtained in each Comparative Example was measured using the above method and the results as shown in the following Table 1 were obtained.

C. or more, the mixed solution was subsequently allowed to settle to separate into an organic solvent solution layer and an aqueous solution layer, and then the organic solvent solution separated into a layer was withdrawn to isolate the (meth) acrylate-based polymer from the organic solvent solution. In particular, when the reaction solution was washed by admixing water at the temperature of 130 to 150° C., a high-purity (meth)acrylate-based polymer (PMMA-PnBA-PMMA triblock copolymer) with the removal ratio of the aluminum component of 80% or more was obtained.

In contrast, in Comparative Examples 1 and 2, after adding acetic acid to a reaction solution containing the (meth)acrylate-based polymer (PMMA-PnBA-PMMA triblock copolymer), the reaction solution was washed by admixing water at the temperature lower than 90° C. The resultant mixed solution was not separated into two layers of an organic solvent solution layer and an aqueous solution layer after the mixed solution after washing was allowed to settle for a long time, but generated a cloudy intermediate layer between the organic solvent solution layer and the aqueous solution layer. In the (meth)acrylate-based polymer (PMMA-PnBA-PMMA triblock copolymer) isolated from the separated organic solvent solution, the removal ratio of the aluminum component was low compared with Examples 1 to 6 and the purity was lower than that of the PMMA-PnBA-PMMA triblock copolymer obtained in Examples 1 to 6.

Example 7

(1) Into a polymerization vessel with an inner volume of 20 L in which the atmosphere was replaced by nitrogen was charged 6.75 L of dry toluene, to which 0.13 L of a toluene solution (concentration: 0.6 mol/L) of n-octylbis(2,6-di-t-butylphenoxy)aluminum (organoaluminum compound) was then added at room temperature (23° C.). This solution was

TABLE 1

| | Water washing condition | | | State of layer separation | | Triblock copolymer Al component | |
|---|---|---|---|---|---|---|---|
| | Temperature of reaction solution[1] | Water temperature[2] | Temperature of mixed solution[3] | Settling time (10 minutes) | Settling time (30 minutes) | Residual amount (ppm) | Removal ratio (%) |
| Example 1 | 90° C. | 90° C. | 90° C. | Two layers[4] | Two layers[4] | 377 | 63 |
| Example 2 | 100° C. | 100° C. | 100° C. | Two layers[4] | Two layers[4] | 275 | 73 |
| Example 3 | 110° C. | 110° C. | 110° C. | Two layers[4] | Two layers[4] | 265 | 74 |
| Example 4 | 130° C. | 130° C. | 130° C. | Two layers[4] | Two layers[5] | 194 | 81 |
| Example 5 | 140° C. | 140° C. | 140° C. | Two layers[5] | Two layers[5] | 183 | 82 |
| Example 6 | 150° C. | 150° C. | 150° C. | Two layers[5] | Two layers[5] | 143 | 86 |
| Comparative Example 1 | 60° C. | 60° C. | 60° C. | —[6] | Three layers[7] | 683 | 33 |
| Comparative Example 2 | 80° C. | 80° C. | 80° C. | —[6] | Three layers[7] | 540 | 47 |

[1]Temperature of the reaction solution containing the PMMA-PnBA-PMMA triblock copolymer.
[2]Temperature of distilled water for washing.
[3]Temperature of the mixed solution of the reaction solution and distilled water.
[4]Layer separation into two layers of organic solvent solution layer (somewhat cloudy) and aqueous solution layer.
[5]Layer separation into two layers of organic solvent solution layer (clear) and aqueous solution layer.
[6]No layer separation.
[7]Layer separation into three layers of organic solvent solution layer (cloudy)-intermediate layer (cloudy)-aqueous solution layer.

As seen in the results in the above Table 1, the removal ratio of the aluminum component is as high as 63% or more in Examples 1 to 6. This is because acetic acid was added to a reaction solution containing the (meth)acrylate-based polymer (PMMA-PnBA-PMMA triblock copolymer), the mixture was washed by admixing water at the temperature of 90° chilled to 0° C., to which 23.2 mL of a cyclohexane solution (concentration: 1.3 mol/L) of t-butyllithium (organolithium compound) was added with stirring, and after 30 minutes 244 ml of methyl methacrylate (MMA) was gradually added to initiate polymerization. The polymerization was continued for 2 hours while maintaining the temperature at 0° C. after completion of the addition. The temperature in the polymerization tank was subsequently chilled to −30° C. To the tank, 1734 ml of n-butyl acrylate (nBA) was added. After completion of the addition, the mixture was stirred at −30° C. for 10 minutes and the temperature of the reaction solution was returned to room temperature. To the mixture, 144 ml (9 times by mol the amount required for neutralization of the organoaluminum compound and organolithium compound used in the polymerization reaction) of acetic acid (water content: 0.1% by mass or less) was added to terminate the polymerization reaction and to produce an acetic acid compound bound with the aluminum component and lithium component present in the reaction solution.

(2) A small amount (1 ml) of the reaction solution obtained in (1) above was withdrawn and dried under reduced pressure (267 Pa (2 Torr), 60° C., 24 hours) to yield a polymer. GPC measurement showed that the resulting polymer was a diblock copolymer composed of polymethyl methacrylate (PMMA)-polybutyl acrylate (PnBA). The values of the number average molecular weight of PMMA and that of PnBA in this diblock copolymer determined by GPC were 7600 and 51000, respectively and the mass ratio of each polymer block (PMAA/PnBA) was 13/87.

The content of the aluminum component in the diblock copolymer obtained was measured using the above method to give 1146 ppm.

(3) Into a vessel B was charged 10 L of the reaction solution containing the diblock copolymer (PMMA-PnBA diblock copolymer) after addition of acetic acid obtained in above (1).

(4) The reaction solution in the vessel B was heated through a heating apparatus (heat exchanger) to 100° C. and supplied at a feed rate of 5 L/min to a static mixer Ma (Super Static Mixer S. SM made by Shinyu-Giken Co., Ltd.). At the same time, distilled water was heated through a heating apparatus (heat exchanger) to 90° C. and supplied at a feed rate of 5 L/min to the above static mixer Ma to mix the reaction solution with the water in the static mixer Ma (temperature of the mixed solution in static mixer Ma: 90° C. and residence time: 0.5 second), and the mixed solution discharged from the static mixer Ma was introduced into an autoclave C to allow to settle in the vessel C under pressurized conditions with heating (temperature: 90° C. and pressure: 0.4 MPa).

(5) The mixed solution in the vessel C was clearly separated into two layers, in which the upper layer was composed of an organic solvent solution and the lower layer was composed of an aqueous solution without forming an intermediate layer between the two layers in 30 minutes after the time of initiating settling (the time at which the mixed was charged into the autoclave vessel C after the total volume (10 L) of the reaction solution charged into vessel B was admixed with water in the static mixer Ma).

(6) About 2 ml of the organic solvent solution from the upper layer (organic solvent solution layer) that was separated in (5) above was withdrawn and dried under reduced pressure (267 Pa (2 Torr), 60° C., 24 hours) to yield about 0.5 g of a PMMA-PnBA diblock copolymer.

(7) The content of the aluminum component in the PMMA-PnBA diblock copolymer obtained in (6) above was measured using the above method to give 435 ppm (the removal ratio of the aluminum component based on the content of the aluminum component in the PMMA-PnBA diblock copolymer measured in (2) above: 62%).

Example 8

(1) A reaction solution containing a PMMA-PnBA-PMMA triblock copolymer was prepared by polymerizing under same conditions and same operations to those in (1) of Example 1 and the temperature of this reaction solution was returned to room temperature. To the solution, 7.2 ml (3 times by mol the total mol of organoaluminum compound and organolithium compound used in the polymerization reaction) of acetic acid (water content: 0.1% by mass or less) was added to terminate the polymerization reaction and to produce an acetic acid compound bound with the aluminum component and lithium component present in the reaction solution (the total volume of reaction solution formed: 617 ml).

(2) About a half of the reaction solution (300 ml) containing the triblock copolymer (PMMA-PnBA-PMMA triblock copolymer) after addition of acetic acid obtained in (1) above was charged into the same autoclave A equipped with a propeller-type stirrer used in Example 1 and the solution was heated to 110° C.

(3) Next, 300 ml of distilled water, which was heated in advance to 110° C. were introduced into the above vessel A and the resultant solution was mixed for 10 minutes with stirring under pressurized conditions with heating (number of revolution of propeller in mixing: 700 rpm and pressure in vessel A: 0.4 MPa). During this time the temperature of the mixed solution in the vessel A was kept at 110° C.

(4) After stirring was stopped to allow the mixed solution to settle in the vessel A (the liquid temperature during settling: 110° C.), the mixed solution was clearly separated into two layers, in which the upper layer was composed of an organic solvent solution and the lower layer was composed of an aqueous solution without forming an intermediate layer between the two layers in 30 minutes after stopping stirring.

(5) The aqueous solution in the lower layer, which was separated in (4) above was discharged from the bottom of the vessel A and only the organic solvent solution in the vessel A was left and the organic solvent solution left in the vessel A was heated to 110° C.

(6) A 300 ml distilled water heated in advance to 110° C. was introduced into the above vessel A charged with the organic solvent solution heated to 110° C., and the resultant mixed solution was mixed for 10 minutes with stirring under pressurized conditions with heating (number of revolution of propeller in mixing: 700 rpm and pressure in vessel A: 0.4 MPa). During this time the temperature of the mixed solution in the vessel A was kept at 110° C.

(7) After stirring was stopped to allow the mixed solution to settle in the vessel A (the liquid temperature during settling: 110° C.), the mixed solution was clearly separated into two layers, in which the upper layer was composed of the organic solvent solution and the lower layer was composed of the aqueous solution without forming an intermediate layer between the two layers in 30 minutes after stopping stirring.

(8) About 2 ml of the organic solvent solution from the upper layer (organic solvent solution layer) which was separated in (7) above were withdrawn and dried under reduced pressure (267 Pa (2 Torr), 60° C., 24 hours) to yield about 0.5 g of a PMMA-PnBA-PMMA triblock copolymer.

(9) The content of the aluminum component in the PMMA-PnBA-PMMA triblock copolymer obtained in (8) above was measured using the above method to give 69 ppm (the removal ratio of the aluminum component based on the content of the aluminum component in the PMMA-PnBA-PMMA triblock copolymer measured in (2) in Example 1: 93%).

Comparative Example 3

(1) An operation same to (1) to (7) in Example 8 was carried out to run the water washing step twice except that in (2), (3), (5) and (6) in Example 8, the temperature of the reaction solution, the organic solvent solution, distilled water and a mixed solution charged into the autoclave A was changed to 80° C. and the settling temperature in (4) and (7) in Example 8 was changed to 75° C. A solution separated into an organic solvent solution layer and an aqueous solution layer was obtained.

In this Comparative Example 3, after the mixed solution of the reaction solution with water was allowed to settle for layer separation after running a first washing step by admixing the reaction solution with water, settling for 1 hour after stopping stirring failed to separate the mixed solution completely into two layers of an organic solvent solution layer and an aqueous solution layer, and a cloudy intermediate layer was formed between the upper layer composed of the organic solvent solution and the lower layer composed of the aqueous solution.

In this Comparative Example 3, a supernatant liquid of the organic solvent solution layer was withdrawn and mixed with distilled water at 80° C. to run a second washing step. The resultant mixed solution was allowed to settle, but a complete layer separation was not observed (operation corresponding to (7) in Example 8), and a cloudy intermediate layer thinner than the above intermediate layer was formed between the upper layer composed of an organic solvent solution and the lower layer composed of an aqueous solution.

(2) About 2 ml of the organic solvent solution from the upper layer (organic solvent solution layer) in (1) above was withdrawn and dried under reduced pressure (267 Pa (2 Torr), 60° C., 24 hours) to yield about 0.5 g of a PMMA-PnBA-PMMA triblock copolymer.

(3) The content of the aluminum component in the PMMA-PnBA-PMMA triblock copolymer obtained in (2) above was measured using the above method to give 321 ppm (the removal ratio of the aluminum component based on the content of the aluminum component in the PMMA-PnBA-PMMA triblock copolymer measured in (2) above in Example 1: 72%), and the residual amount of the aluminum component was higher than in Example 8.

Example 9

(1) Into a polymerization vessel with an inner volume of 1 L in which atmosphere was replaced by nitrogen was charged 1700 ml of dry toluene, to which 36 ml of a toluene solution (concentration: 0.6 mol/L) of isobutylbis(2,6-di-t-butyl-4-methylphenoxy)aluminum (organoaluminum compound) and 3.6 ml of N,N,N',N'',N''-pentamethyldiethylenetriamine were then added at room temperature (23° C.). This solution was cooled to 23° C., to which 7 ml of a cyclohexane solution (concentration: 1.3 mol/L) of t-butyllithium (organolithium compound) was added with stirring and 74 ml of methyl methacrylate (MMA) was gradually added to initiate polymerization. The polymerization was continued for 2 hours while maintaining the temperature at 30° C. after completion of the addition. The temperature in the polymerization tank was subsequently chilled to −30° C., to which 270 ml of n-butyl acrylate (nBA) was added over 60 minutes. After completion of the addition, 194 ml of methyl methacrylate (MMA) was rapidly added to the resultant mixture solution, which was stirred at −30° C. for about 5 minutes and its temperature was raised to 20° C. to continue the polymerization for 12 hours while maintaining the same temperature.

(2) A small amount (1 ml) of the reaction solution obtained in (1) above was withdrawn and dried under reduced pressure (267 Pa (2 Torr), 60° C., 24 hours) to yield a polymer. GPC measurement showed that the resulting polymer was a triblock copolymer composed of polymethyl methacrylate (PMMA), polybutyl acrylate (PnBA), and polymethyl methacrylate (PMMA). The values of number average molecular weight of the first PMMA, that of PnBA and that of the second PMMA in this triblock copolymer determined by GPC were 8500, 31000 and 15000, respectively, and the mass ratio of each polymer block (PMAA/PnBA/PMMA) was 14/50/36.

The content of the aluminum component and the lithium component in the triblock copolymer (about 100 mg) obtained in above (1) was measured using the above method to give 1030 ppm of the aluminum component (aluminum element content) and 110 ppm of the lithium component (lithium element content), respectively.

(3) Acetic acid (water content: 0.1% by mass or less) was added in the amount of 0.9% by mass to the reaction solution obtained in (1) above. The amount of the acetic acid added was 2.5 times by mol the amount required to neutralize the aluminum component, lithium component and N,N,N',N'',N''-pentamethyldiethylenetriamine present in the reaction solution.

(4) Into the above autoclave A (inner volume: 1 L) equipped with a propeller-type stirrer was charged 300 ml of the reaction solution containing the triblock copolymer (PMMA-PnBA-PMMA triblock copolymer) after addition of acetic acid obtained in (3) above and the solution was heated to 115° C.

(5) Into the above vessel A was then introduced 300 ml of distilled water heated to 115° C. in advance and the mixed solution was mixed for 60 minutes with stirring under pressurized conditions with heating (stirring power in mixing: 100 w/m$^3$ and pressure in vessel A: 0.4 MPa) During the stirring, the temperature of the mixed solution in the vessel A was kept at 115° C.

(6) After stirring was stopped to allow the mixed solution to settle in the vessel A (liquid temperature during settling: 115° C.), the mixed solution was clearly separated into two layers, in which the upper layer was composed of an organic solvent solution and the lower layer was composed of an aqueous solution without forming an intermediate layer between the two layers in 30 minutes after stopping stirring.

(7) The upper layer (organic solvent solution layer), which was separated in (6) above was isolated and recovered and an operation similar to those of (4) to (6) was performed one more time under the same conditions (same temperature, same stirring power, same pressure in vessel and same stirring time) (the total number of washing: twice).

(8) After the second washing step in (7) above, an organic solvent solution from the upper layer (organic solvent solution layer) of two layers separated into the upper layer composed of the organic solvent solution and the lower layer composed of the aqueous layer without forming an intermediate layer was dried under reduced pressure (267 Pa (2 Torr), 60° C. and 24 hours) to yield a PMMA-PnBA-PMMA triblock copolymer.

(9) The content of the aluminum component and the lithium component in the PMMA-PnBA-PMMA triblock copolymer obtained in (8) above was measured using the above method to give 65 ppm of the aluminum component (the removal ratio of the aluminum component based on the content of the aluminum component in the PMMA-PnBA-PMMA triblock copolymer measured in (2) above: 93.7%) and 1.8 ppm of the lithium component (the removal ratio of the lithium component based on the content of the lithium component in the PMMA-PnBA-PMMA triblock copolymer measured in (2) above: 98.4%), respectively.

The PMMA-PnBA-PMMA triblock copolymer obtained in above (8) was used to prepare a 3 mm thick sheet according to the above method and its haze value was measured using the above method to give 4%.

Example 10

(1) Using 300 ml of the reaction solution after addition of acetic acid obtained in (3) in Example 9, an operation similar to (4) to (8) in Example 9 was carried out by changing the preheating temperature of the reaction solution (solution to be washed) and the water temperature in washing in (4) to (8) in Example 9 to 120° C. each, and the total number of washing to 4.

(2) After the fourth washing step in (1) above, an organic solvent solution from the upper layer (organic solvent solution layer) of two layers separated into the upper layer composed of the organic solvent solution and the lower layer composed of the aqueous solution without forming an intermediate layer was dried under reduced pressure (267 Pa (2 Torr), 60° C. and 24 hours) to yield a PMMA-PnBA-PMMA triblock copolymer.

(3) The content of the aluminum component and the lithium component in the PMMA-PnBA-PMMA triblock copolymer obtained in above (2) was measured using the above method to give 9 ppm of the aluminum component (the removal ratio of the aluminum component based on the content of the aluminum component in the PMMA-PnBA-PMMA triblock copolymer measured in (2) above in Example 9: 99.1%) and 0.6 ppm of the lithium component (the removal ratio of the lithium component based on the content of the lithium component in the PMMA-PnBA-PMMA triblock copolymer measured in (2) above in Example 9: 99.5%), respectively.

Example 11

(1) An operation similar to (1) in Example 9 was carried out except that the scale of the raw materials used was different. There was obtained a reaction solution containing a PMMA-PnBA-PMMA triblock copolymer (number average molecular weight of the first PMMA=8300, number average molecular weight of PnBA=32000, number average molecular weight of the second PMMA=15000 and mass ratio of PMMA/PnBA/PMMA=14/50/36) (content of aluminum component in triblock copolymer=1030 ppm and content of lithium component=110 ppm).

(2) Acetic acid (water content: 0.1% by mass or less) was added in the amount of 0.7% by mass to the reaction solution obtained in (1) above (the amount of acetic acid added=4 times the total mol of the aluminum component and lithium component in the reaction solution).

(3) Into the vessel B, 10 L of the reaction solution after addition of acetic acid obtained in (2) above was charged.

(4) A mixing apparatus C1 (an autoclave equipped with a propeller-type stirrer having an inner volume of 1 L), a settling apparatus D1 (an autoclave having an inner volume of 1 L), a mixing apparatus C2 (an autoclave equipped with a propeller-type stirrer having an inner volume of 500 ml) and a settling apparatus D2 (an autoclave having an inner volume of 1 L) were arranged in series.

(5) Distilled water was heated by passing through a heating apparatus (heat exchanger) to 140° C. and supplied to the mixing apparatus C2 at a feed rate of 600 ml/hr. While maintaining the liquid temperature at 140° C., the liquid in the mixing apparatus C2 was supplied to the settling apparatus D2 at a feed rate of 600 ml/hr.

(6) The internal fluid was supplied at a liquid feed rate of 600 ml/hr from a lower part of the settling apparatus D2 to the mixing apparatus C1, and the reaction solution in the vessel B was heated to 140° C. by passing through a heating apparatus (heat exchanger), and supplied to the mixing apparatus C1 at a feed rate of 600 ml/hr to mix the reaction solution in the mixing apparatus C1 and water supplied from the lower part of the settling apparatus D2 (the liquid temperature in the mixing apparatus C1: 140° C.) and then the resultant mixed solution was introduced into the settling apparatus D1 while maintaining the liquid volume in the mixing apparatus C1 constant and allowed to settle in the settling apparatus D1 under pressurized conditions with heating (temperature: 140° C. and pressure: 0.6 MPa).

(7) The lower layer solution (waste water) of the two separated layers in the settling apparatus D1 was discharged at a liquid feed rate of 600 ml/hr and the upper layer solution (reaction solution after washing once) was introduced into the mixing apparatus C2 at a liquid feed rate of 600 ml/hr while maintaining a total volume of the liquid constant (residence time: about 40 minutes).

(8) The solution supplied from the upper layer in the settling apparatus D1 (reaction solution after washing once) was mixed with distilled water supplied and heated to 140° C. in advance in the mixing apparatus C2 (the solution temperature in mixing apparatus C2: 140° C.) and the mixed solution was then introduced into the settling apparatus D2 while maintaining the liquid volume in the mixing apparatus C2 constant for settling in the settling apparatus D2 under pressurized conditions with heating (temperature 140° C. and pressure: 0.6 MPa).

(9) The bottom layer solution (recycled as washing water in the first run) of the two separated layers in the settling apparatus D2 was subsequently supplied to the mixing apparatus C1 at a liquid feed rate of 600 ml/hr and the upper layer solution (reaction solution after washing twice) was fed at a liquid feed rate of 600 ml/hr through a condenser (heat exchanger) to cool and recover while maintaining the total volume of the solution in the settling apparatus D2 constant (residence time: about 40 minutes).

(10) After the above continuous metal removal operation was carried out for about 8 hours, the recovered solution was sampled, and an organic solvent solution was evaporated and dried under reduced pressure (267 Pa (2 Torr), 60° C. and 24 hours), to obtain a PMMA-PnBA-PMMA triblock copolymer.

(11) The content of the aluminum component and the lithium component in the PMMA-PnBA-PMMA triblock copolymer obtained in (10) above was measured using the above method to give 8 ppm of the aluminum component (the removal ratio of the aluminum component based on the content of the aluminum component in the PMMA-PnBA-PMMA triblock copolymer measured in (1) above: 99.2%) and 0.2 ppm of the lithium component (the removal ratio of the lithium component based on the content of the lithium component in the PMMA-PnBA-PMMA triblock copolymer measured in (1) above: 99.8%), respectively.

The PMMA-PnBA-PMMA triblock copolymer obtained in (10) above was used to prepare a 3-mm thick sheet according to the above method and its haze value was measured using the above method to give 2%.

INDUSTRIAL APPLICABILITY

According to the present invention, a high quality (meth) acrylate-based polymer having small residual amount of impurities composed of metal components, high purity and excellent in characteristics such as heat resistance, transparency and others is smoothly and efficiently provided using a simple operation from a reaction solution containing the (meth)acrylate-based polymer obtained by polymerizing a (meth)acrylate-based monomer in the presence of metal compounds (in particular, a polymerization initiator composed of an organic alkali metal compound and an organoaluminum compound), thus the present invention is industrially useful.

The invention claimed is:

1. A method of obtaining a (meth)acrylate-based polymer from a reaction solution containing the (meth)acrylate-based polymer, said method comprising:
   (a) adding a carboxylic acid having a water content of 20% by mass or less to the reaction solution containing the (meth)acrylate-based polymer, wherein said (meth)acrylate-based polymer is obtained by a polymerization of a monomer composed mainly of a (meth)acrylate in a water-insoluble organic solvent in the presence of an organoaluminum compound and a polymerization initiator, wherein said polymerization initiator comprises an organic alkali metal compound, and wherein the concentration of the polymerization initiator is 1 to 10 mmol per 1 liter of polymerization solution and the amount of the organoaluminum compound is from 0.5 to 20 times, per mol, the amount of the polymerization initiator;
   (b) washing the reaction solution to which the carboxylic acid has been added in (a) by admixing water at a temperature of from 90° C. to 150° C., thereby forming a mixture of water and the reaction solution;
   (c) separating the mixture of water and the reaction solution generated in (b) into an organic solvent solution layer and an aqueous solution layer; and
   (d) isolating each of the organic solvent solution and the aqueous solution layers obtained in (c), and
   recovering the (meth)acrylate-based polymer from the organic solvent solution isolated in (d),
   wherein the (meth)acrylate-based polymer is a diblock copolymer composed of a methacrylate-based polymer block and an acrylate-based polymer block, or a triblock copolymer composed of a methacrylate-based polymer block, an acrylate-based polymer block and a methacrylate-based polymer block.

2. A method of obtaining a (meth)acrylate-based polymer from a reaction solution containing the (meth)acrylate-based polymer, said method comprising:
   (a) adding a carboxylic acid having a water content of 20% by mass or less to the reaction solution containing the (meth)acrylate-based polymer, wherein said (meth)acrylate-based polymer is obtained by a polymerization of a monomer composed mainly of a (meth)acrylate in a water-insoluble organic solvent in the presence of a metal compound an organoaluminum compound and a polymerization initiator, wherein said polymerization initiator comprises an organic alkali metal compound, and wherein the concentration of the polymerization initiator is 1 to 10 mmol per 1 liter of polymerization solution and the amount of the organoaluminum compound is from 0.5 to 20 times, per mol, the amount of the polymerization initiator;
   (b) washing the reaction solution to which the carboxylic acid has been added in (a) by admixing water at a temperature of from 90° C. to 150° C., thereby forming a mixture of water and the reaction solution;
   (c) separating the mixture of water and the reaction solution generated in (b) into an organic solvent solution layer and an aqueous solution layer;
   (d) isolating each of the organic solvent solution and the aqueous solution layers obtained in (c); and
   (e) performing:
      (e-1) washing the isolated organic solvent solution obtained in (d) by admixing water at a temperature of from 90° C. to 150° C., thereby forming a mixture of the organic solvent solution and water,
      (e-2) separating the mixture of the organic solvent solution and water generated in (e-1) into an organic solvent solution layer and an aqueous solution layer, and
      (e-3) isolating each of the organic solvent solution and the aqueous solution layers obtained in (e-2),
      and then recovering the (meth)acrylate-based polymer from the organic solvent solution isolated in (e-3),
   wherein the performance of (e-1) through (e-3) is carried out once or multiple times, and
   wherein the (meth)acrylate-based polymer is a diblock copolymer composed of a methacrylate-based polymer block and an acrylate-based polymer block, or a triblock copolymer composed of a methacrylate-based polymer block, an acrylate-based polymer block and a methacrylate-based polymer block.

3. The method of obtaining a (meth)acrylate-based polymer according to claim 1, wherein the carboxylic acid is brought into contact with a metal component derived from either the organoaluminum compound or the organic alkali metal compound present in the reaction solution in (a).

4. The method of obtaining a (meth)acrylate-based polymer according to claim 1, wherein the water-insoluble organic solvent is a hydrocarbon.

5. The method of obtaining a (meth)acrylate-based polymer according to claim 1, wherein (b) is carried out by admixing 0.1 to 10 parts by volume of water to 1 part by volume of the reaction solution.

6. The method of obtaining a (meth)acrylate-based polymer according to claim 1, wherein the organoaluminum compound is represented by formula (I):

$$AlR^1R^2R^3 \qquad (I)$$

wherein
$R^1$, $R^2$ and $R^3$ are each independently an alkyl group optionally having a substituent, a cycloalkyl group optionally having a substituent, an aryl group optionally having a substituent, an aralkyl group optionally having a substituent, an alkoxy group optionally having a substituent, an aryloxy group optionally having a substituent or a N,N-disubstituted amino group; or
$R^2$ and $R^3$ are bonded together to form an arylenedioxy group optionally having a substituent, and $R^1$ is an alkyl group optionally having a substituent, a cycloalkyl group optionally having a substituent, an aryl group optionally having a substituent, an aralkyl group optionally having a substituent, an alkoxy group optionally having a substituent, an aryloxy group optionally having a substituent or a N,N-disubstituted amino group.

7. The method of obtaining a (meth)acrylate-based polymer according to claim 1, wherein said method is carried out through a continuous process.

8. The method of obtaining a (meth)acrylate-based polymer according to claim 2, wherein the carboxylic acid is brought into contact with a metal component derived from either the organoaluminum compound or the organic alkali metal compound present in the reaction solution in (a).

9. The method of obtaining a (meth)acrylate-based polymer according to claim 2, wherein the water-insoluble organic solvent is a hydrocarbon.

10. The method of obtaining a (meth)acrylate-based polymer according to claim 2, wherein (b) is carried out by admixing 0.1 to 10 parts by volume of water to 1 part by volume of the reaction solution, and (e-1) is carried out by admixing 0.1 to 10 parts by volume of water to 1 part by volume of the isolated organic solvent solution obtained in (d).

11. The method of obtaining a (meth)acrylate-based polymer according to claim 2, wherein the organoaluminum compound is represented by formula (I):

$$AlR^1R^2R^3 \tag{I}$$

wherein $R^1$, $R^2$ and $R^3$ are each independently an alkyl group optionally having a substituent, a cycloalkyl group optionally having a substituent, an aryl group optionally having a substituent, an aralkyl group optionally having a substituent, an alkoxy group optionally having a substituent, an aryloxy group optionally having a substituent or a N,N-disubstituted amino group; or $R^2$ and $R^3$ are bonded together to form an arylenedioxy group optionally having a substituent, and $R^1$ is an alkyl group optionally having a substituent, a cycloalkyl group optionally having a substituent, an aryl group optionally having a substituent, an aralkyl group optionally having a substituent, an alkoxy group optionally having a substituent, an aryloxy group optionally having a substituent or a N,N-disubstituted amino group.

12. The method of obtaining a (meth)acrylate-based polymer according to claim 2, wherein said method is carried out through a continuous process.

13. The method of obtaining a (meth)acrylate-based polymer according to claim 2, wherein in (e-1) the water is admixed with the isolated organic solvent solution obtained in (d) by a dynamic stirring apparatus with a stirring power of 30 to 1000 w/m$^3$, or by a static stirring apparatus with a stirring power of 30 to 1000 w/m$^3$.

* * * * *